US012789631B2

(12) United States Patent
Yamamura et al.

(10) Patent No.: US 12,789,631 B2
(45) Date of Patent: Nov. 10, 2026

(54) ELECTRICAL CIRCUIT BREAKER DEVICE

(71) Applicant: PACIFIC ENGINEERING CORPORATION, Gifu (JP)

(72) Inventors: Naoki Yamamura, Gifu (JP); Akihiko Shimizu, Gifu (JP)

(73) Assignee: PACIFIC ENGINEERING CORPORATION, Gifu (JP)

( * ) Notice: Subject to any disclaimer, the term of this patent is extended or adjusted under 35 U.S.C. 154(b) by 175 days.

(21) Appl. No.: 18/863,650

(22) PCT Filed: Feb. 16, 2023

(86) PCT No.: PCT/JP2023/005346

§ 371 (c)(1),
(2) Date: Nov. 7, 2024

(87) PCT Pub. No.: WO2023/218715

PCT Pub. Date: Nov. 16, 2023

(65) Prior Publication Data

US 2026/0257561 A1 Sep. 3, 2026

(30) Foreign Application Priority Data

May 13, 2022 (JP) ................................ 2022-079299

(51) Int. Cl.
*B60L 3/04* (2006.01)
*H01H 1/42* (2006.01)
(Continued)

(52) U.S. Cl.
CPC ................. *B60L 3/04* (2013.01); *H01H 1/42* (2013.01); *H01H 9/32* (2013.01); *H01H 37/54* (2013.01); *H01H 39/006* (2013.01)

(58) Field of Classification Search
CPC ... B60L 3/04; H01H 1/42; H01H 9/52; H01H 3/54; H01H 39/00; H01H 39/006
See application file for complete search history.

(56) References Cited

U.S. PATENT DOCUMENTS 4,479,105 A 10/1984 Banes
5,808,253 A 9/1998 Hatakeyama
(Continued)

FOREIGN PATENT DOCUMENTS

CN 112331539 2/2021
JP 45-028139 B1 9/1970
(Continued)

OTHER PUBLICATIONS

WO PCT/JP2021/044029 Wtn Opn, Feb. 8, 2022, Pacific Engineering Corp.
(Continued)

*Primary Examiner* — Robert L Deberadinis
(74) *Attorney, Agent, or Firm* — D. Brent Kenady; Wells St. John P.S.

(57) ABSTRACT

The present invention provides an electric circuit breaker device that can suppress an increase in power of a power source and easily break an electric circuit even when resistance of a cut portion is reduced. An electric circuit breaker device includes a broken portion constituting a part of an electric circuit, in which the broken portion includes base pieces on both sides and a separation piece connected between the base pieces, and the electric circuit breaker device includes a pressing connection portion that connects, while pressing, contact surfaces of the base piece and the separation piece, and is configured such that the separation piece is moved by a power mechanism while being in contact along a contact surface with the base piece and is separated from the base piece, and thus connection between the base pieces is broken.

7 Claims, 23 Drawing Sheets

(51) Int. Cl.

| | |
|---|---|
| ***H01H 9/32*** | (2006.01) |
| ***H01H 37/54*** | (2006.01) |
| ***H01H 39/00*** | (2006.01) |

(56) References Cited

U.S. PATENT DOCUMENTS

| | | | |
|---|---|---|---|
| 6,281,782 | B1 | 8/2001 | Morimoto |
| 6,418,005 | B1 | 7/2002 | Endo |
| 10,535,485 | B2 | 1/2020 | Ando |
| 2018/0122606 | A1 | 5/2018 | Ando |
| 2020/0035437 | A1 | 1/2020 | Gaudinat |
| 2021/0057172 | A1 | 2/2021 | Fukuda |
| 2021/0159035 | A1 | 5/2021 | Koprivsek |
| 2021/0233729 | A1 | 7/2021 | Nakatani |
| 2023/0066646 | A1 | 3/2023 | Nakatani |
| 2023/0386777 | A1 | 11/2023 | Kondo |
| 2024/0258055 | A1 | 8/2024 | Kondo |

FOREIGN PATENT DOCUMENTS

| | | | | | |
|---|---|---|---|---|---|
| JP | 59-169029 | | | 9/1984 | |
| JP | H08279327 | | | 10/1996 | |
| JP | 10-241546 | | | 9/1998 | |
| JP | 2000215769 | | | 8/2000 | |
| JP | 2000-251599 | | | 9/2000 | |
| JP | 2021-061146 | | | 4/2001 | |
| JP | 2001110293 | | | 4/2001 | |
| JP | 2011-060687 | | | 3/2011 | |
| JP | 2017-117565 | | | 6/2017 | |
| JP | 2021-051989 | | | 4/2021 | |
| JP | 2021/517342 | | | 7/2021 | |
| JP | 2021-170522 | | | 10/2021 | |
| JP | 2022-095112 | | | 6/2022 | |
| JP | 2023-000054 | | | 1/2023 | |
| WO | WO 2019/181469 | A1 | | 9/2019 | |
| WO | WO 2019/235082 | A1 | | 12/2019 | |
| WO | WO-2020189377 | A1 | * | 9/2020 | ............ H01H 39/00 |
| WO | WO 2020/204154 | A1 | | 10/2020 | |
| WO | WO 2021/131535 | A1 | | 7/2021 | |
| WO | WO 2021/220588 | A1 | | 11/2021 | |
| WO | PCT/JP2021/044029 | | | 2/2022 | |
| WO | PCT/JP2022/018346 | | | 6/2022 | |
| WO | PCT/JP2022/031283 | | | 11/2022 | |
| WO | PCT/JP2023/005346 | | | 5/2023 | |
| WO | WO 2023/218715 | A1 | | 11/2023 | |

OTHER PUBLICATIONS

WO PCT/JP2022/031283 Wtn Opn, Nov. 1, 2022, Pacific Engineering Corp.

* cited by examiner

ELECTRICAL CIRCUIT BREAKER DEVICE

CROSS REFERENCE TO RELATED APPLICATION

This is a 35 U.S.C. § 371 application of, and claim priority to, International Application No. PCT/JP2023/005346, filed on Feb. 16, 2023, which was published as WO2023/218715A1 on Nov. 16, 2023, and which claim priority to JP Patent Application No. 2022-079299, which was filed on May 13, 2022, the entirety of each of which is incorporated by reference herein.

TECHNICAL FIELD

The present invention relates to an electric circuit breaker device that can be used mainly for an electric circuit of an automobile or the like.

BACKGROUND ART

Conventionally, an electric circuit breaker device has been used to protect an electric circuit mounted on an automobile or the like and various electric components connected to the electric circuit. Specifically, when an abnormality occurs in the electric circuit, the electric circuit breaker device disconnects a part of the electric circuit to physically break the electric circuit.

There are various types of this electric circuit breaker device. For example, the electric circuit breaker device of Patent Literature 1 is an electric circuit breaker device including a housing, a cut portion disposed in the housing and constituting a part of an electric circuit, a power source disposed on a first end side of the housing, and a mobile body that moves in the housing between the first end and a second end opposite to the first end. While the mobile body moves by the power source from the first end toward the second end, a part of the mobile body cuts the cut portion to break the electric circuit.

Since voltage and current applied to an electric circuit tend to increase due to performance improvement of automobiles and the like in recent years, heat generation by the current flowing through a cut portion constituting a part of the electric circuit, that is, a power loss also increases. Therefore, the power loss is suppressed by increasing the cut cross-sectional area by increasing the thickness of the cut portion and reducing the resistance of the cut portion. However, when the cut cross-sectional area is increased, power for cutting the cut portion needs to be increased, and as a result, the strength of the housing needs to be further improved so as to withstand the increased power (explosive power of gunpowder or the like). There is a problem that the housing becomes large and the size and price of the electric circuit breaker device increase accordingly.

CITATIONS LIST

Patent Literature

Patent Literature 1: Japanese Patent Application 2021-100645

SUMMARY OF INVENTION

Technical Problems

Therefore, in view of the above problems, the present invention provides an electric circuit breaker device that can suppress an increase in power of a power source and easily break an electric circuit even when resistance of a cut portion is reduced.

Solutions to Problems

An electric circuit breaker device of the present invention is an electric circuit breaker device including: a broken portion constituting a part of an electric circuit, in which the broken portion includes base pieces on both sides and a separation piece connected between the base pieces, and the electric circuit breaker device includes a pressing connection portion that connects, while pressing, contact surfaces of the base piece and the separation piece, and is configured such that the separation piece is moved by a power mechanism while being in contact along a contact surface with the base piece and is separated from the base piece, and thus connection between the base pieces is broken.

According to the above characteristic, the base piece and the separation piece, which are separate bodies, are maintained in a state of being electrically connected by the pressing connection portion. Furthermore, when the electric circuit is broken, the connection state between the base piece and the separation piece, which are originally separate bodies, may be separated, unlike a known case where an integrally formed broken portion is physically cut with a large force. Therefore, even when the resistance of the broken portion is reduced, the electric circuit can be easily broken with less power than ever, and the size and manufacturing cost of the electric circuit breaker device can be suppressed.

Along the contact surfaces of the base piece and the separation piece, the separation piece moves while being in contact with the base piece. Therefore, by appropriately adjusting the maximum frictional force of the contact surfaces of the base piece and the separation piece to be small by reducing the surface roughness of the contact surfaces of the base piece and the separation piece, it is possible to reduce the force required for separating the separation piece from the base piece. As a result, the electric circuit can be easily broken with less power, and the size and manufacturing cost of the electric circuit breaker device can be suppressed.

In the electric circuit breaker device of the present invention, an arc-extinguishing portion is provided adjacent to the separation piece, and the arc-extinguishing portion is connected between the base pieces after the separation piece moves to break connection between the base pieces.

According to the above characteristic, even when an arc by a high voltage is generated between the base pieces on both sides, the arc-extinguishing portion connected between the base pieces can effectively extinguish the arc.

In the electric circuit breaker device of the present invention, the arc-extinguishing portion is integrated with the separation piece.

According to the above characteristic, after the separation piece is separated from the base pieces, the arc-extinguishing portion is smoothly switched as it is, and is reliably connected between the base pieces.

In the electric circuit breaker device of the present invention, an arc-extinguishing material having a fluid shape or a granular shape is disposed in a moving direction of the separation piece, and when the separation piece moves, the separation piece enters the arc-extinguishing material up to a connection terminal part of the separation piece.

According to the above characteristic, immediately before the separation piece separates from the base piece, the arc generated around the connection terminal part is effectively extinguished by the arc-extinguishing material.

The electric circuit breaker device of the present invention includes an arc-extinguishing material disposed at a position where the arc-extinguishing material comes into contact with a connection terminal part of the separation piece when the separation piece moves.

According to the above characteristic, according to the above characteristic, immediately before the separation piece separates from the base piece, the arc generated around the connection terminal part is effectively extinguished by the arc-extinguishing material.

The electric circuit breaker device of the present invention includes a mobile body that moves between a first end provided with the power mechanism and a second end opposite to the first end, in which the mobile body is configured to move by power of the power mechanism to separate the separation piece from the base piece, and the mobile body is integrated with the separation piece.

According to the above characteristic, since the separation piece is a separate body from the base piece, even if the mobile body and the separation piece are integrated, the mobile body and the entire broken portion are not integrated, and thus there is no possibility that the electric circuit breaker device becomes large in size. Furthermore, since the assembly man-hours is reduced, reduction in assembly time can be achieved.

The electric circuit breaker device of the present invention includes: a fuse including a fuse portion and an arc-extinguishing material; and an insulator adjacent to the separation piece, in which the insulator is provided with a pair of electrodes connected to the fuse, and when the separation piece moves to break connection between the base pieces, an electrode of the insulator is connected between the base pieces.

According to the above characteristic, when the separation piece is completely separated from the base piece and the electric circuit is broken, overcurrent is smoothly and reliably induced to the fuse, and therefore an arc due to a fault current can be prevented from being generated between the base pieces on both sides.

Advantageous Effects of Invention

As described above, according to the electric circuit breaker device of the present invention, it is possible to suppress an increase in power of a power source and easily break an electric circuit even when resistance of a cut portion is reduced.

REFERENCE SIGNS LIST

300 Housing
400 Broken portion
420 Separation piece
430 Base piece

600 Electric circuit breaker device

DESCRIPTION OF EMBODIMENTS

Each embodiment of the present invention will be described with reference to the drawings. Note that the shape, material, and the like of each member of the electric circuit breaker device in the embodiment described below are merely examples, and are not limited to them.

First Embodiment

Figure 1A:
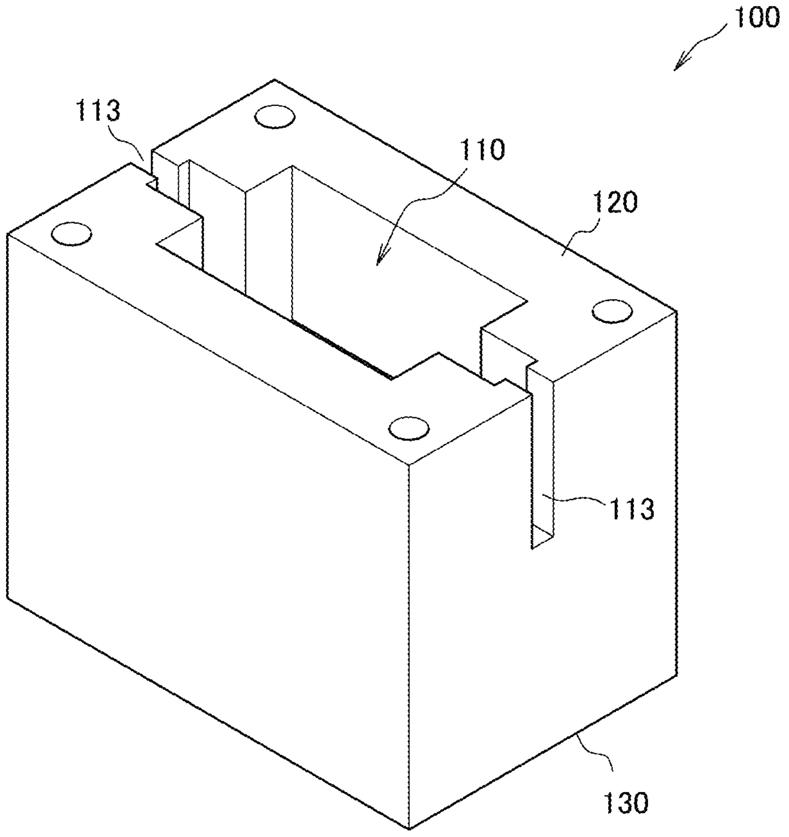
FIG. 1(*a*) is an overall perspective view of a lower housing constituting a housing of an electric circuit breaker device according to a first embodiment of the present invention, and FIG. 1(*b*) is a plan view of the lower housing.
Figure 1B:
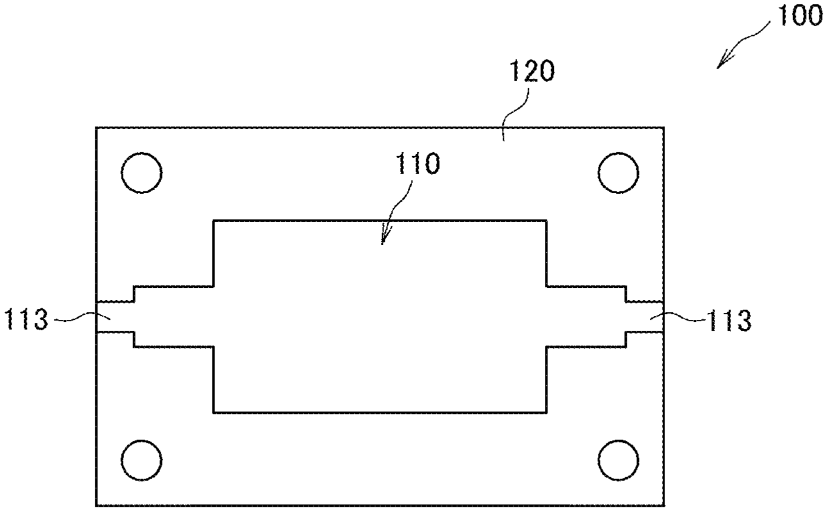

First, FIG. 1 illustrates a lower housing 100 constituting a housing 300 of the electric circuit breaker device according to the first embodiment of the present invention. Note that FIG. 1(*a*) is an overall perspective view of the lower housing 100, and FIG. 1(*b*) is a plan view of the lower housing 100.

As illustrated in FIG. 1, the lower housing 100 is a substantially quadrangular prism body made of an insulator such as a synthetic resin, and internally includes a lower accommodation portion 110 that is hollow. This lower accommodation portion 110 extends from an upper surface 120 toward a lower surface 130 of the lower housing 100, and is configured to be able to accommodate a mobile body 500 described later.

Furthermore, a part of the upper surface 120 includes an insertion portion 113 recessed in accordance with the shape of a base piece 430 so that the base piece 430 of a broken portion 400 described later can be inserted. This insertion portion 113 is disposed so as to face both sides of the lower accommodation portion 110, and the insertion portion 113 supports, on both sides, the broken portion 400 extending linearly.

Figure 2A:
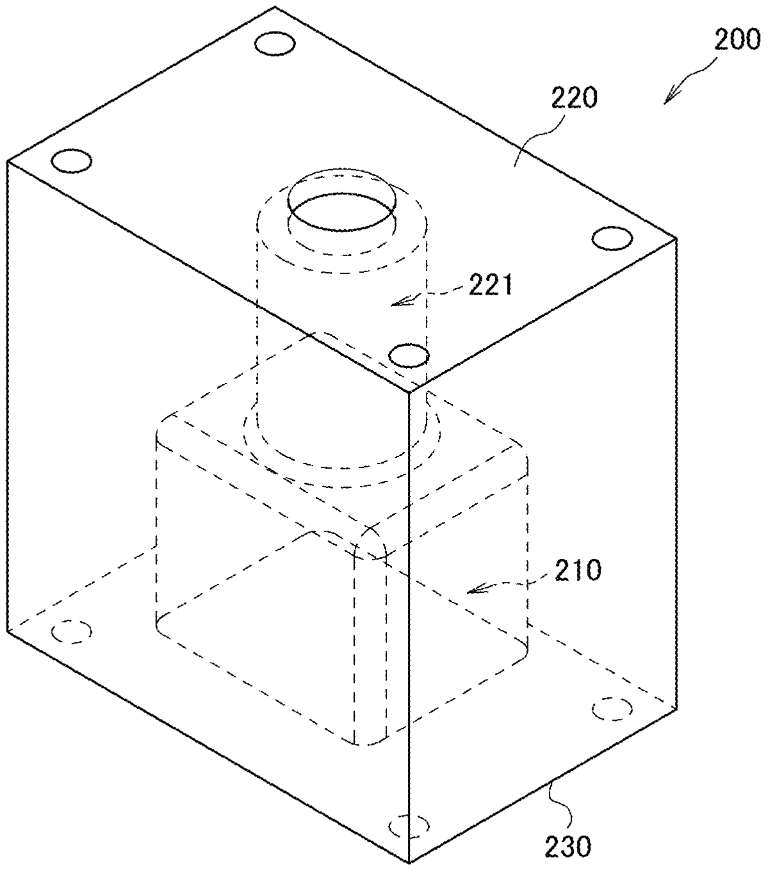
FIG. 2(*a*) is an overall perspective view of an upper housing constituting the housing of the electric circuit breaker device according to the first embodiment of the present invention, and (b) is a bottom view of the upper housing.
Figure 2B:
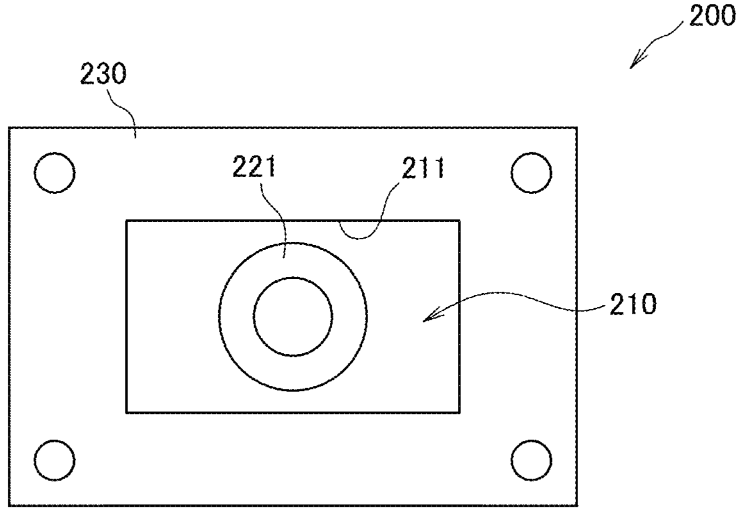

Next, FIG. 2 illustrates an upper housing 200 constituting the housing 300 of the electric circuit breaker device according to the first embodiment of the present invention. FIG. 2(*a*) is an overall perspective view of the upper housing 200, and FIG. 2(*b*) is a bottom view of the upper housing 200.

As illustrated in FIG. 2, the upper housing 200 is a substantially quadrangular prism body made of an insulator such as a synthetic resin, and constitutes the housing 300 paired with the lower housing 100 illustrated in FIG. 1. The upper housing 200 internally includes an upper accommodation portion 210 that is hollow, and this upper accommodation portion 210 extends from a lower surface 230 toward an upper surface 220 of the upper housing 200, and is configured to be able to accommodate the mobile body 500 described later. An inner surface 211 of the upper accommodation portion 210 is a smooth surface so that the mobile body 500 can slide inside in the up-down direction. As described later, the upper accommodation portion 210 is arranged up and down with the lower accommodation portion 110 of the lower housing 100 to constitute an accommodation portion 310 extending linearly, and the mobile body 500 can move up and down in the accommodation portion 310.

Furthermore, a power source storage portion 221 in which a power source P is accommodated is formed in a part of the upper surface 220 side of the upper housing 200. The power source storage portion 221 communicates with an upper end side of the upper accommodation portion 210. As described in detail later, power such as air pressure generated from the power source P accommodated in the power source storage portion 221 is transmitted to the mobile body 500 in the upper accommodation portion 210 and moves the mobile body 500. Note that the lower housing 100 and the upper housing 200 are substantially quadrangular prism bodies made of a synthetic resin, but are not limited to this, and may have any shape made of another material as long as they have high insulating properties and strength enough to withstand use.

Figure 3A:
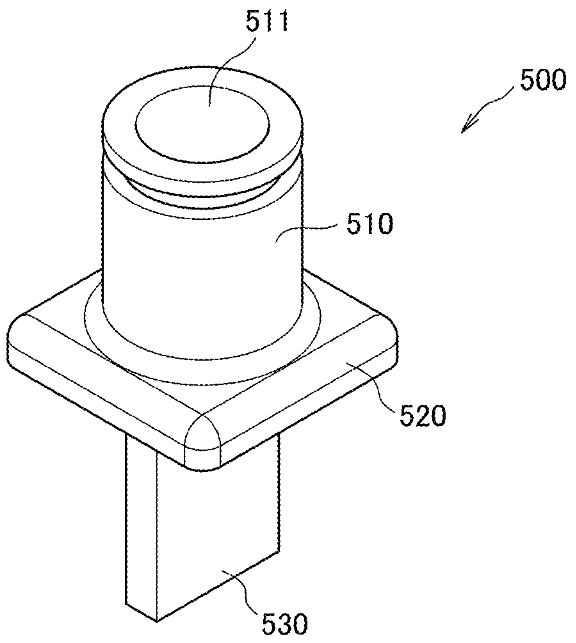
FIG. 3(*a*) is a perspective view of a mobile body of the electric circuit breaker device according to the first embodiment of the present invention, and (b) is a bottom view of the mobile body.
Figure 3B:
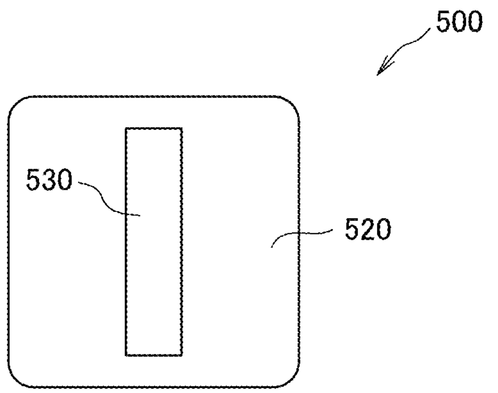

Next, FIG. 3 illustrates the mobile body 500 according to the first embodiment of the present invention. Note that FIG. 3(*a*) is a perspective view of the mobile body 500, and FIG. 3(*b*) is a bottom view of the mobile body 500.

As illustrated in FIG. 3, the mobile body 500 is made of an insulator such as a synthetic resin, and includes a main body 510 having a substantially columnar shape on the upper end side, a sliding portion 520 having a flat quadrangular shape at the center, and a protrusion portion 530 protruding downward on the lower end side. The upper end of the main body 510 is provided with a recess portion 511, and the recess portion 511 is a portion facing the power source P. The sliding portion 520 has a shape corresponding to the inner surface shape of the accommodation portion 310, and the sliding portion 520 slides on the inner surface of the accommodation portion 310, whereby the mobile body 500 can smoothly slide while maintaining a posture along the inner side of the accommodation portion 310. Note that the mobile body 500 is made of a synthetic resin, but are not limited to this, and may have any shape made of another material as long as they have high insulating properties and strength enough to withstand use.

Figure 4A:
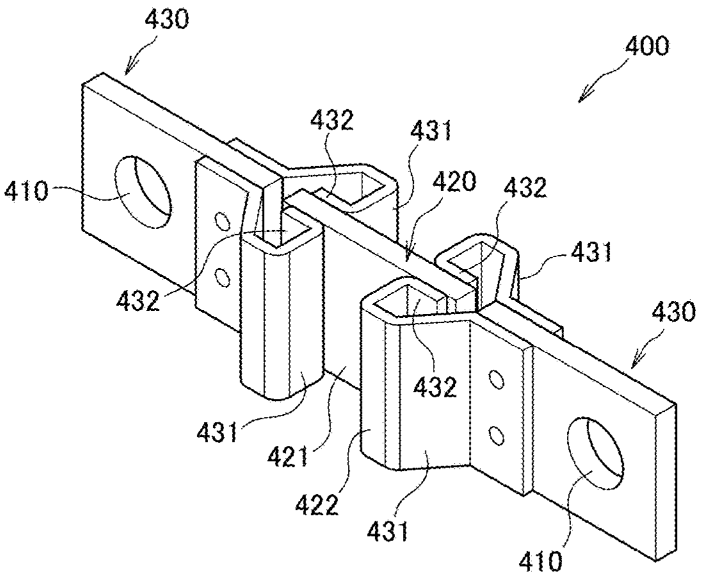
FIG. 4(*a*) is a perspective view of a broken portion of the electric circuit breaker device according to the first embodiment of the present invention, (b) is a side view of the broken portion, and (c) is a plan view of the broken portion.
Figure 4B:
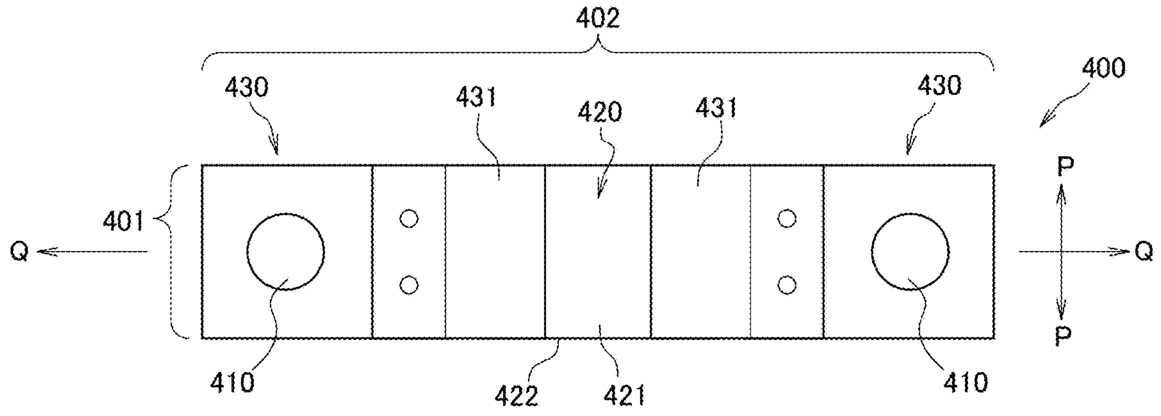
Figure 4C:
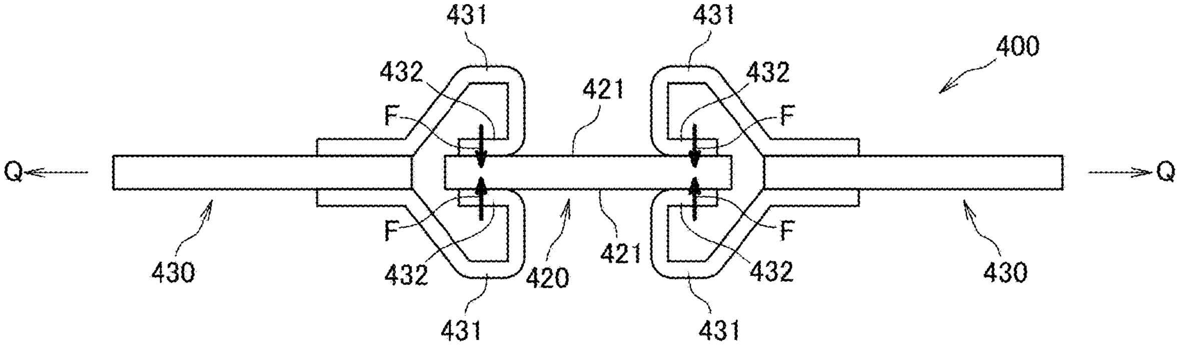

Next, FIG. 4 illustrates a broken portion 400 constituting a part of an electric circuit broken by an electric circuit breaker device 600 according to the first embodiment of the present invention. Note that FIG. 4(*a*) is a perspective view of the broken portion 400, FIG. 4(*b*) is a side view of the broken portion 400, and FIG. 4(*c*) is a plan view of the broken portion 400.

The broken portion 400 is a conductor entirely made of metal such as copper in order to be electrically connected with the electric circuit, and includes the base pieces 430 for being electrically connected with the electric circuit at both ends, and a separation piece 420, which is a separate body from the base pieces 430 and positioned between the base pieces 430. A connection hole 410 used for connection with the electric circuit is formed at the end of the base piece 430. The base piece 430 includes a pressing connection portion 431 including a pair of holding pieces. This pressing connection portion 431 is also entirely made of a conductor made of metal such as copper in order to be electrically connected with the electric circuit. The pressing connection portion 431 holds the separation piece 420 from both sides of the separation piece 420.

More specifically, the tip end of the pressing connection portion 431 is a flat surface 432, and the flat surface 432 is in contact with a side surface 421 of the separation piece 420 having a plate shape. In particular, since the side surface 421 of the separation piece 420 is also a flat surface, the flat surface 432 of the pressing connection portion 431 and the side surface 421 of the separation piece 420 are in close contact with each other and are in surface contact with each other. The contact surfaces of the base piece 430 and the separation piece 420, that is, the flat surface 432 of the pressing connection portion 431 and the side surface 421 of the separation piece 420 are pressed by a pressing force F by which the pressing connection portion 431 holds the separation piece 420. Therefore, the base piece 430 and the separation piece 420, which are separate bodies, are assembled so as to be electrically and physically connected to each other.

In particular, since the pressing force F is applied to the contact surfaces of the base piece 430 and the separation piece 420, the contact resistance of the contact surfaces of the base piece 430 and the separation piece 420 (the contact surfaces of the flat surface 432 of the pressing connection portion 431 and the side surface 421 of the separation piece 420) can be suppressed to be low, and further, that state can be maintained for a long period of time. Note that suppressing the contact resistance between the contact surfaces of the base piece 430 and the separation piece 420 to be low means suppressing the electrical resistance between the contact surfaces on both sides in contact with each other to be low because the contact surfaces of the base piece 430 and the separation piece 420 (the contact surfaces of the flat surface 432 of the pressing connection portion 431 and the side surface 421 of the separation piece 420) more strongly adhere to each other by the pressing force F, and thus the current easily flows accordingly.

A plating layer may be formed by performing plating on the contact surface (in FIG. 4, the flat surface 432) of the base piece 430 or the contact surface (in FIG. 4, the side surface 421) of the separation piece 420, or the contact surface of the base piece 430 and the contact surface of the separation piece 420. This plating layer can fill gaps due to minute unevenness on the contact surface of the base piece 430 and the contact surface of the separation piece 420, and suppress oxidation due to the surrounding environment, and therefore the contact resistance can be kept low for a long period of time. Furthermore, this plating layer includes tin (Sn), and has hardness lower than that of metal such as copper (Cu) constituting the broken portion 400 (i.e., the separation piece 420 and the base piece 430). Due to this, when applied with the pressing force F, the plating layer having low hardness is strongly pressed and crushed by the contact surface of the base piece 430 and the contact surface of the separation piece 420 having high hardness, and therefore the gaps due to the minute unevenness of the contact surface of the base piece 430 and the contact surface of the separation piece 420 can be more reliably filled and the contact resistance can be suppressed to be low. The plating layer may be made of gold (Au), silver (Ag), or the like, and may have hardness lower than that of metal such as copper (Cu) constituting the broken portion 400, and may have an electrical conductivity higher than or equal to that of metal such as copper (Cu).

The broken portion 400 has a long plate shape as a whole similarly to the broken portion of a known electric circuit breaker device, and includes a short side 401 and a long side 402 as illustrated in FIG. 4(*b*). The short direction of the broken portion 400 is a direction along a P-P axis perpendicular to a long axis Q-Q extending along the long side 402 of the broken portion 400. Note that the separation piece 420 is not limited to the shape illustrated in FIG. 4, and may have any shape as long as the base pieces 430 on both sides can be electrically and physically connected. The pressing connection portion 431 connecting the base piece 430 and the separation piece 420 while pressing the contact surfaces of them has an aspect of a pair of holding pieces, but is not limited to this, and may have any configuration as long as it can connect the base piece 430 and the separation piece 420 while pressing the contact surfaces of them.

Figure 5:
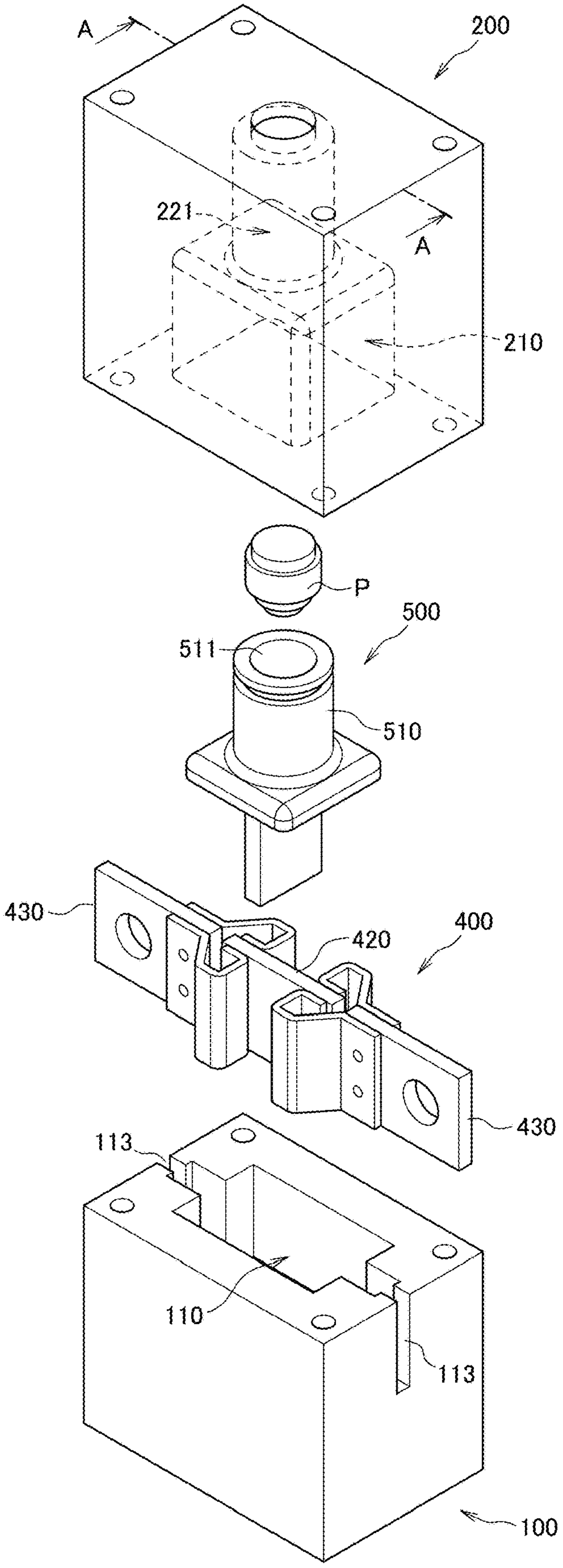
FIG. 5 is an exploded perspective view of the electric circuit breaker device according to the first embodiment of the present invention.
Figure 6:
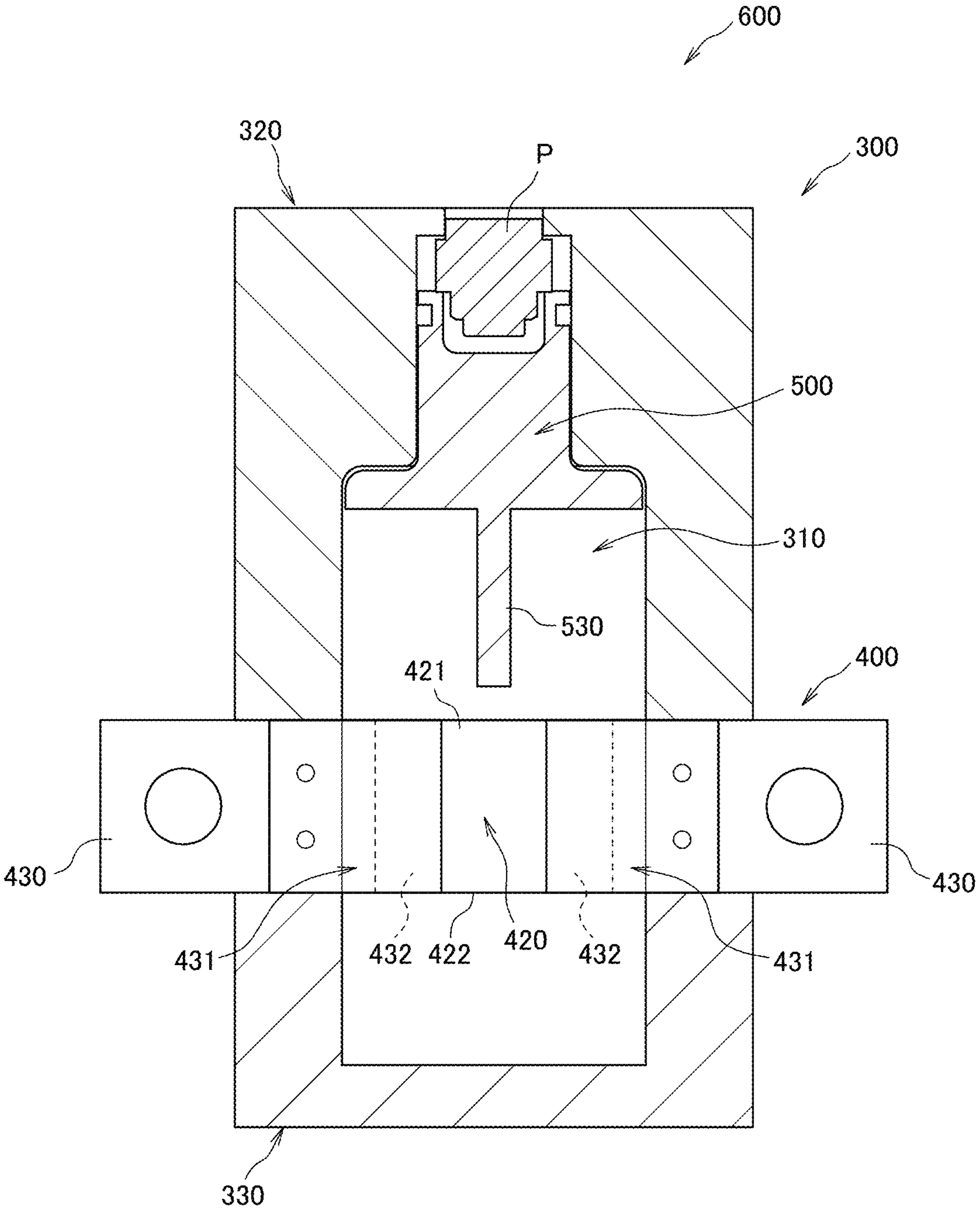
FIG. 6 is a cross-sectional view taken along line A-A in a state where the electric circuit breaker device illustrated in FIG. 5 is assembled.

Next, an assembly method of the electric circuit breaker device 600 of the present invention will be described with reference to FIGS. 5 and 6. Note that FIG. 5 is an exploded perspective view of the electric circuit breaker device 600, and FIG. 6 is a cross-sectional view taken along line A-A in a state where the electric circuit breaker device 600 illustrated in FIG. 5 is assembled.

When the electric circuit breaker device 600 is assembled, first, the base piece 430 of the broken portion 400 is inserted into the insertion portion 113 of the lower housing 100, and the broken portion 400 is disposed such that the separation piece 420 crosses the lower accommodation portion 110 of the lower housing 100.

Next, the upper housing 200 is fitted from above the lower housing 100 such that the main body 510 side of the mobile body 500 is inserted into the upper accommodation portion 210 of the upper housing 200. In this manner, the housing 300 including the lower housing 100 and the upper housing 200 is assembled in a state where the broken portion 400 and the mobile body 500 are accommodated internally.

Furthermore, the power source storage portion 221 of the upper housing 200 is attached with the power source P as a power mechanism that moves the separation piece 420, and a part of the power source P is accommodated in the recess portion 511 of the mobile body 500. When an abnormality signal is input from the outside at the time of detecting an abnormality of the electric circuit, the power source P explodes gunpowder in the power source P, for example, and instantaneously pushes out and moves the mobile body 500 in the accommodation portion 310 by air pressure due to the explosion. Note that the power source P is not limited to a power source using gunpowder as long as it generates power for moving the mobile body 500, and other known power sources may be used.

As illustrated in FIG. 6, the mobile body 500 is accommodated in the accommodation portion 310 including the lower accommodation portion 110 and the upper accommodation portion 210 linearly arranged. This accommodation portion 310 extends from a first end 320 of the housing 300 to a second end 330 on the opposite side of the first end 320. Since the mobile body 500 is disposed on the first end 320 side where the power source P is disposed, the second end 330 side of the accommodation portion 310 is hollow. Therefore, as described later, the mobile body 500 can move on the second end 330 side while separating the separation piece 420. Since the recess portion 511 on the upper end side of the mobile body 500 is adjacent to the power source P, the air pressure due to the explosion of the gunpowder in the power source P is transmitted to the upper end side of the mobile body 500 as described later.

Note that as illustrated in FIG. 6, the electric circuit breaker device 600 assembled and completed is used by being attached in an electric circuit desired to protect. Specifically, the base piece 430 of the broken portion 400 is connected to a part of the electric circuit, and the broken portion 400 constitutes a part of the electric circuit. In normal times, since the base piece 430 and the separation piece 420 of the broken portion 400 are not separated from each other and are physically and electrically connected to each other, current flows in the electric circuit via the base piece 430 and the separation piece 420 of the broken portion 400.

Next, the electric circuit breaker device 600 breaking the electric circuit when an abnormality such as overcurrent flowing through the electric circuit is detected will be described with reference to FIG. 7. Note that FIG. 7 is a cross-sectional view illustrating that the mobile body 500 moves from the state illustrated in FIG. 6.

Figure 7:
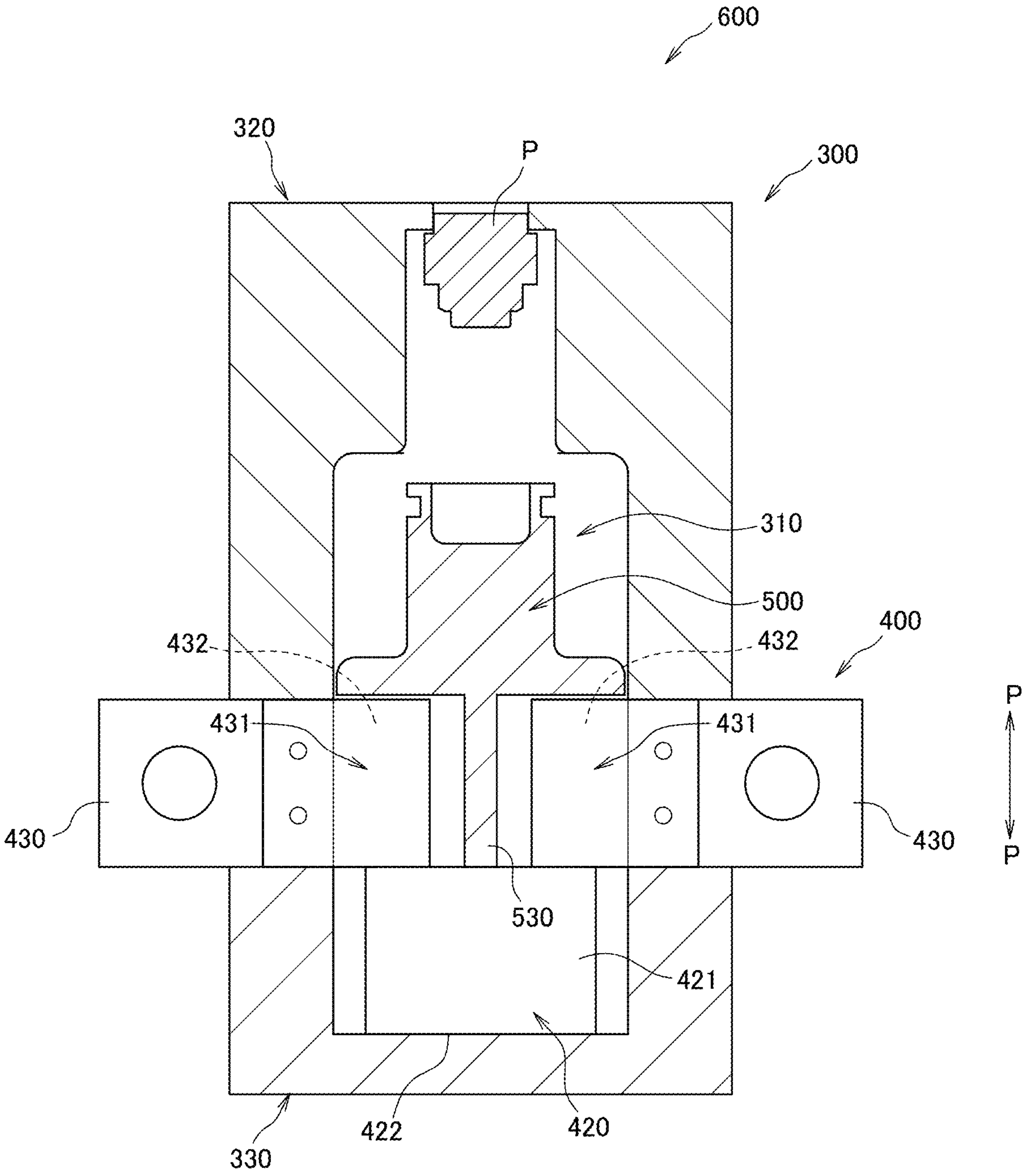
FIG. 7 is a cross-sectional view illustrating that the mobile body moves from the state illustrated in FIG. 6.

First, as illustrated in FIG. 7, when an abnormality such as overcurrent flowing through the electric circuit is detected, an abnormality signal is input to the power source P, and the gunpowder in the power source P explodes. Then, the air pressure due to the explosion is transmitted to the recess portion 511 on the upper end side of the mobile body 500. By this air pressure, the mobile body 500 is vigorously blown away from the first end 320 toward the second end 330, and instantaneously moves in the accommodation portion 310 toward the second end 330.

Then, the protrusion portion 530 of the mobile body 500 strongly pushes out the separation piece 420 on the second end 330 side. The separation piece 420 is pushed out along the P-P axis, that is, along the extending direction of the short side (i.e., the short direction) of 400, the separation piece 420 is separated from the base piece 430, and the base pieces 430 on both sides are brought into an electrically disconnected state. Due to this, the state in which the base pieces 430 on both sides of the broken portion 400 are energized via the separation piece 420 is broken, and over-current can be prevented from flowing through the electric circuit.

Note that the force by which the protrusion portion 530 of the mobile body 500 strongly pushes the separation piece 420 on the second end 330 side is larger than the pressing force F by which the base pieces 430 on both sides hold the separation piece 420 therebetween, and thus the mobile body 500 can separate the separation piece 420 from the base pieces 430. Since the direction of the force by which the mobile body 500 pushes out the separation piece 420 on the second end 330 side and the direction of the pressing force F by which the base pieces 430 on both sides hold the separation piece 420 therebetween intersect with each other, the power of the mobile body 500 is efficiently transmitted to the separation piece 420, and the mobile body 500 can easily separate the separation piece 420 from the base piece 430. In particular, when the direction of the force by which the mobile body 500 pushes out the separation piece 420 on the second end 330 side and the direction of the pressing force F by which the base pieces 430 on both sides hold the separation piece 420 therebetween are orthogonal to each other, the power of the mobile body 500 is more efficiently transmitted to the separation piece 420, and the mobile body 500 can more easily separate the separation piece 420 from the base piece 430.

The thickness (plate thickness) of the broken portion 400 can be made thick similarly to the thickness of the broken portion of the known technique, and the resistance of the broken portion 400 is reduced to suppress power loss. The electric circuit breaker device 600 of the present invention maintains the base piece 430 and the separation piece 420, which are separate bodies, in a state of being electrically connected by the pressing connection portion 431. Furthermore, when the electric circuit is broken, the connection state between the base piece 430 and the separation piece 420, which are originally separate bodies, may be separated, unlike a known case where an integrally formed broken portion is physically cut with a large force. Therefore, even when the resistance of the broken portion 400 is reduced, the electric circuit can be easily broken with less power than ever, and the size and manufacturing cost of the electric circuit breaker device can be suppressed.

Furthermore, when the separation piece 420 moves along the P-P axis, that is, along the extending direction of the short side of 400 and is separated from the base piece 430, the separation piece 420 moves, in contact with the base piece 430, along the contact surfaces of the base piece 430 and the separation piece 420 (the contact surfaces of the flat surface 432 of the pressing connection portion 431 and the side surface 421 of the separation piece 420). The force necessary for separating the separation piece 420 from the base piece 430 needs to be larger than the maximum frictional force on the contact surfaces of the base piece 430 and the separation piece 420 (the contact surfaces of the flat surface 432 of the pressing connection portion 431 and the side surface 421 of the separation piece 420). Therefore, if the maximum frictional force of the contact surfaces of the base piece 430 and the separation piece 420 is appropriately adjusted to be small by reducing the surface roughness of the contact surfaces of the base piece 430 and the separation piece 420 (the contact surfaces of the flat surface 432 of the pressing connection portion 431 and the side surface 421 of the separation piece 420), the force necessary for separating the separation piece 420 from the base piece 430 can be reduced. As a result, the electric circuit can be easily broken with less power, and the size and manufacturing cost of the electric circuit breaker device can be suppressed.

The separation piece 420 having a plate shape moves in a state where the side surface 421 is erected along the P-P axis, that is, along the extending direction of the short side of the broken portion 400. Therefore, since an end side portion 422 side having a smaller surface area than the side surface 421 faces the traveling direction of the separation piece 420, this end side portion 422 becomes a head and moves in the accommodation portion 310 toward the second end 330. Therefore, in the traveling direction of the separation piece 420, the range in which the separation piece 420 interferes with other portions (a part of the accommodation portion 310, an arc-extinguishing material, and the like) can be made as narrow as possible, and the internal structure of the housing 300 can be simplified. Note that in the electric circuit breaker device 600 of the present invention, each constituent element such as the broken portion 400 is accommodated in the housing 300, but the present invention is not limited to this. For example, the electric circuit breaker device 600 may be built in other devices or components together with each constituent element such as the broken portion 400 without the housing 300, and the electric circuit breaker device 600 can be configured in any aspect.

Second Embodiment

Next, an electric circuit breaker device 600A of the present invention according to the second embodiment will be described with reference to FIG. 8. Note that FIG. 8(*a*) is a perspective view of a broken portion 400A and a mobile body 500A of the electric circuit breaker device 600A according to the second embodiment, and FIG. 8(*b*) is a front view of the broken portion 400A and the mobile body 500A. Note that the configuration of the electric circuit breaker device 600A according to the second embodiment is different from the configuration of the electric circuit breaker device 600 according to the first embodiment in the configurations of a pressing connection portion 431A of the broken portion 400A and a protrusion portion 530A of the mobile body 500A, but the other configurations are basically the same as the configuration of the electric circuit breaker device 600 according to the first embodiment, and thus the description of the same configurations will be omitted.

Figure 8A:
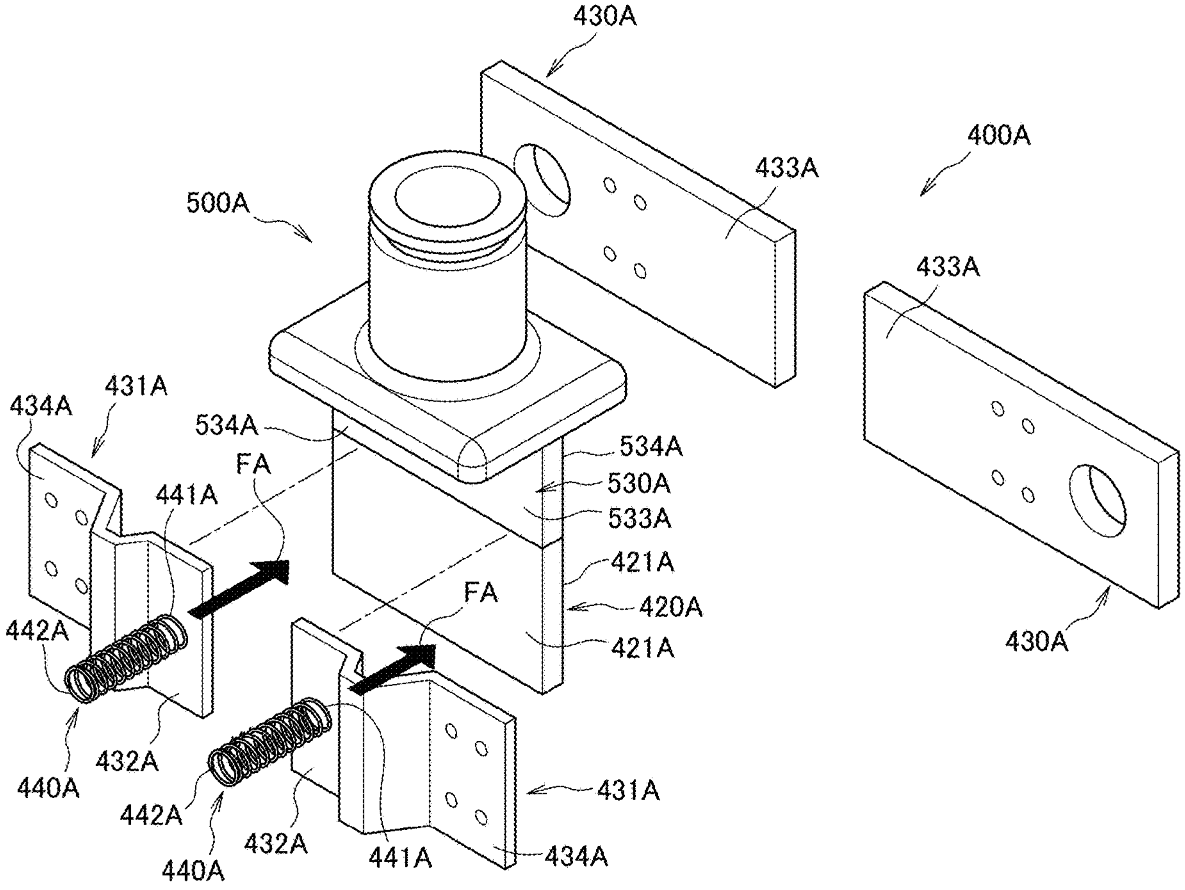
FIG. 8(*a*) is a perspective view of a broken portion and a mobile body of an electric circuit breaker device according to a second embodiment, and (b) is a front view of the broken portion and the mobile body.
Figure 8B:
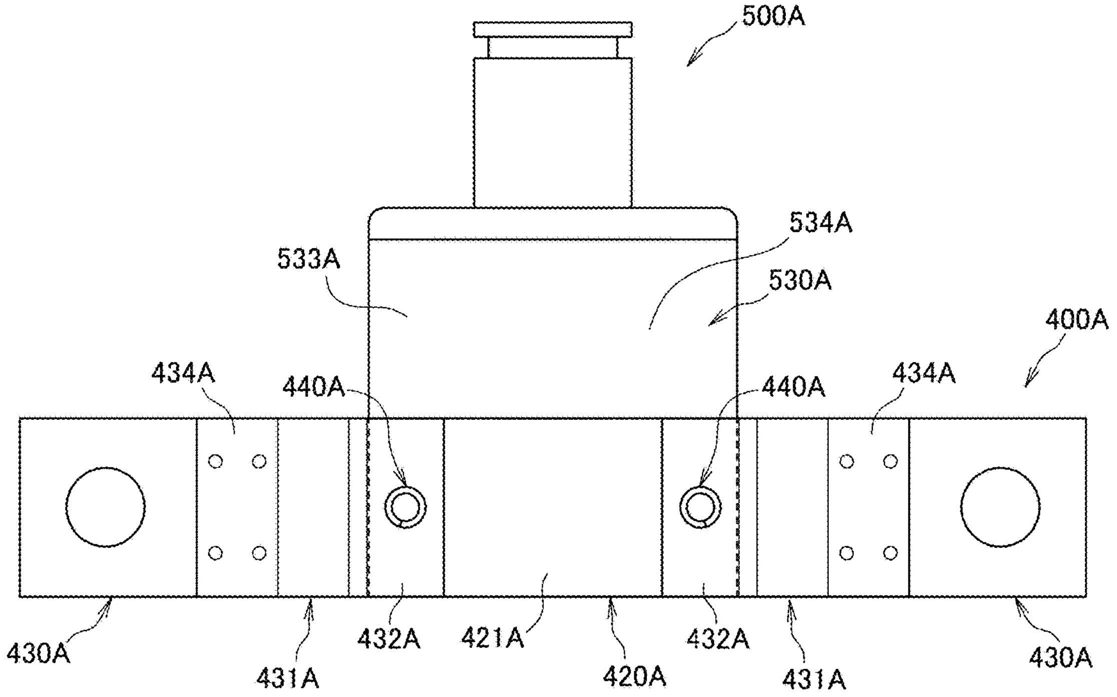

As illustrated in FIG. 8, the broken portion 400A is a conductor entirely made of metal such as copper in order to be electrically connected with the electric circuit, and includes base pieces 430A for being electrically connected with the electric circuit at both ends, and a separation piece 420A positioned between the base pieces 430A. The base piece 430A includes the pressing connection portion 431A including a pressing piece. This pressing connection portion 431A is also entirely made of a conductor made of metal such as copper in order to be electrically connected with the electric circuit. The tip end of the pressing connection portion 431A is a flat surface 432A, and the flat surface 432A is in contact with a side surface 421A on the front side of the separation piece 420A having a plate shape. Since the side surface 421A of the separation piece 420A is also a flat surface, the flat surface 432A of the pressing connection portion 431A and the side surface 421A of the separation piece 420A are in close contact with each other and are in surface contact with each other. Note that a base end 434A of the pressing connection portion 431A is fixed to the surface of the base piece 430A.

An end surface 433A of the inside of the base piece 430A is a flat surface, and the end surface 433A is in contact with the side surface 421A on the back side of the separation piece 420A having a plate shape. Since the side surface 421A of the separation piece 420A is also a flat surface, the end surface 433A and the side surface 421A of the separation piece 420A are in close contact with each other and are in surface contact with each other.

Furthermore, the flat surface 432A of the pressing connection portion 431A is attached with a compression spring 440A. Specifically, one end 441A of the compression spring 440A is attached to the flat surface 432A, and the other end 442A abuts on an inner wall of an accommodation portion 310A when the broken portion 400A is accommodated in the housing 300A. Therefore, the flat surface 432A is pressed against the separation piece 420A by a pressing force FA of the compression spring 440A. The contact surfaces of the base piece 430A and the separation piece 420A, that is, the flat surface 432A of the pressing connection portion 431A and the side surface 421A of the separation piece 420A are pressed by the pressing force FA of the compression spring 440A. Therefore, the base piece 430A and the separation piece 420A, which are separate bodies, are brought into an assembled state so as to be electrically and physically connected to each other.

In particular, since the pressing force FA is applied to the contact surfaces of the base piece 430A and the separation piece 420A, the contact resistance of the contact surfaces of the base piece 430A and the separation piece 420A (the contact surfaces of the flat surface 432A of the pressing connection portion 431A and the side surface 421A of the separation piece 420A) can be suppressed to be low, and further, that state can be maintained for a long period of time. Since the separation piece 420A is pressed also toward the end surface 433A of the base piece 430A by the pressing force FA of the compression spring 440A, the contact resistance of the end surface 433A and the side surface 421A on the back side of the separation piece 420A can be suppressed to be low, and further, that state can be maintained for a long period of time.

As illustrated in FIG. 8, the mobile body 500A includes a protrusion portion 530A protruding downward. This protrusion portion 530A is an arc-extinguishing portion 533A made of an arc-extinguishing material. The arc-extinguishing portion 533A has a plate shape similarly to the separation piece 420A, and a side surface 534A that is flat on the front side of the arc-extinguishing portion 533A is configured to be able to be brought into close contact and surface contact with the flat surface 432A of the pressing connection portion 431A when the protrusion portion 530A moves downward as described later. Similarly, the side surface 534A that is flat on the back side of the arc-extinguishing portion 533A is configured to be able to be brought into close contact and surface contact with the end surface 433A of the base piece 430A. Note that the arc-extinguishing portion 533A can be made of any material as long as the material can extinguish the arc, and can be made by solidifying, for example, silicone, silica sand, or the like into a plate shape.

Figure 9:
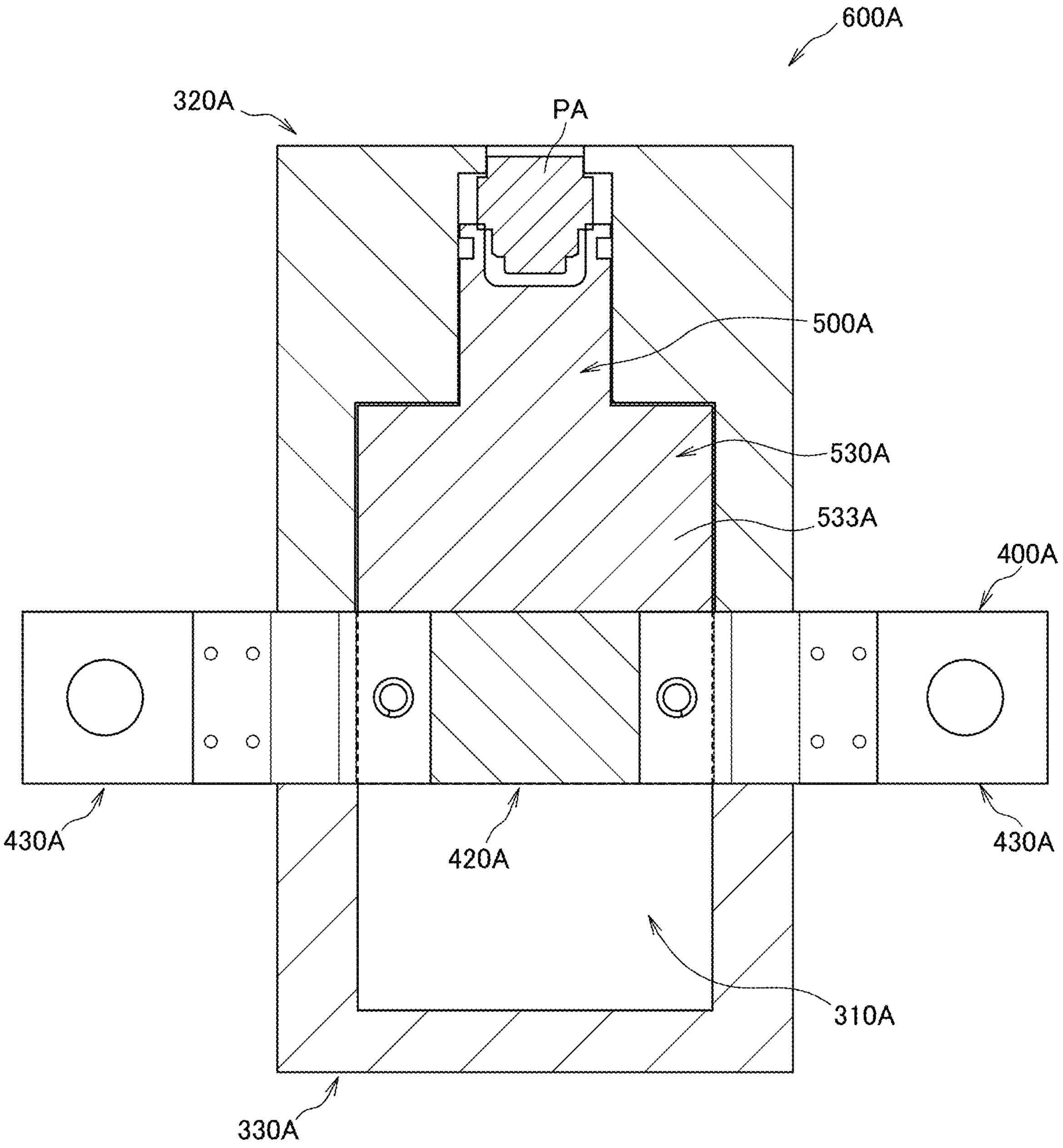
FIG. 9 illustrates a cross-sectional view of the electric circuit breaker device according to the second embodiment, similarly to FIG. 6.

Next, the electric circuit breaker device 600A of the present invention will be described with reference to FIGS. 9 and 10. FIG. 9 illustrates a cross-sectional view of the electric circuit breaker device 600A similarly to FIG. 6, and FIG. 10 is a cross-sectional view illustrating that the mobile body 500A moves from the state illustrated in FIG. 9.

As illustrated in FIG. 9, the base piece 430A of the broken portion 400A is connected to a part of the electric circuit, and the broken portion 400A constitutes a part of the electric circuit. In normal times, since the base piece 430A and the separation piece 420A of the broken portion 400A are not separated from each other and are physically and electrically connected to each other, current flows in the electric circuit via the base piece 430A and the separation piece 420A of the broken portion 400A.

Figure 10:
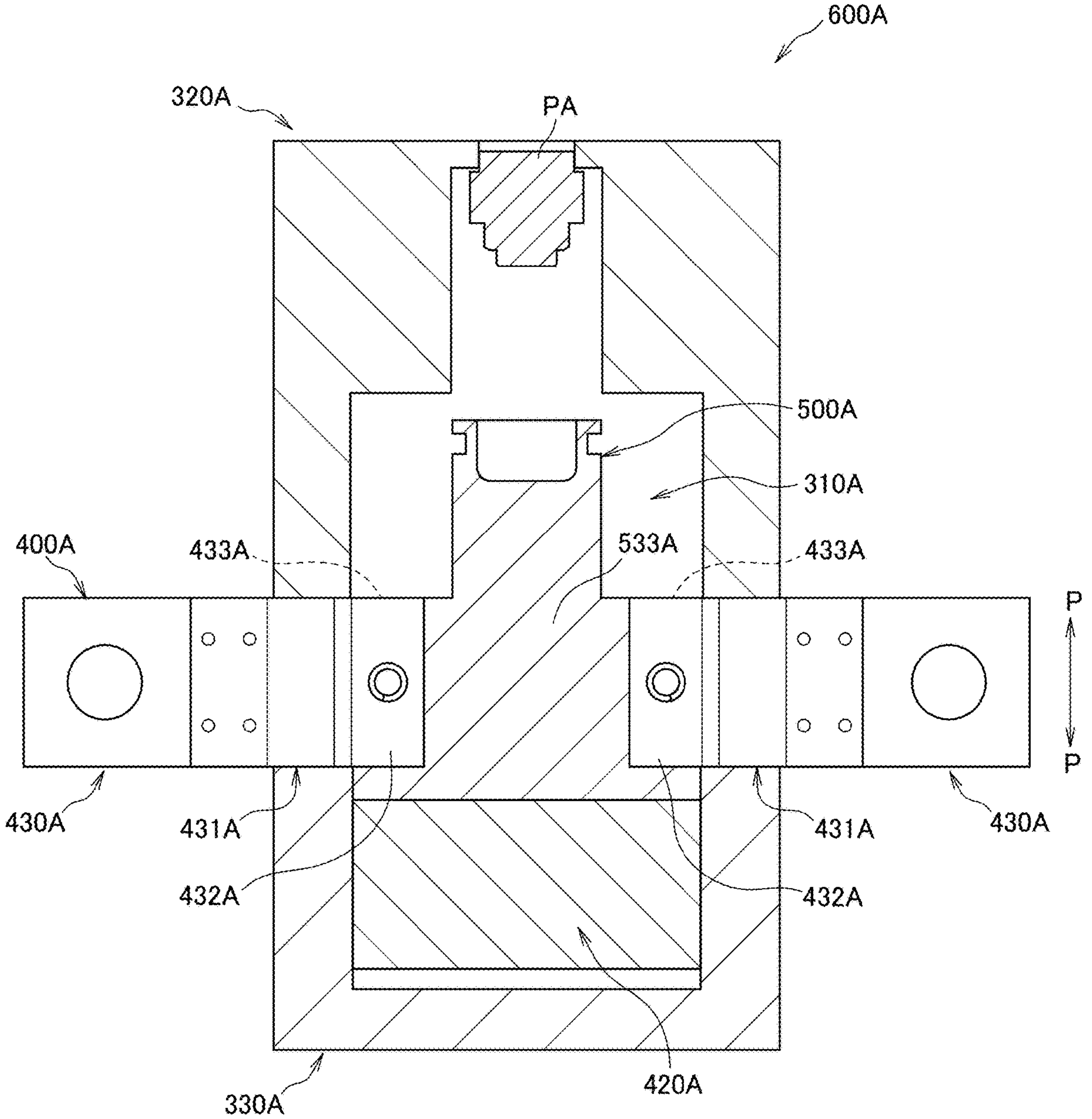
FIG. 10 is a cross-sectional view illustrating that the mobile body moves from the state illustrated in FIG. 9.

Next, as illustrated in FIG. 10, when an abnormality such as overcurrent flowing through the electric circuit is detected, an abnormality signal is input to the power source PA, and the gunpowder in the power source PA explodes. Then, the mobile body 500A is vigorously blown away from the first end 320A toward the second end 330A, and instantaneously moves in the accommodation portion 310A toward the second end 330A.

Then, the arc-extinguishing portion 533A of the mobile body 500A strongly pushes out the separation piece 420A on the second end 330A side. The separation piece 420A is pushed out along the P-P axis, that is, along the extending direction of the short side of the broken portion 400A, the separation piece 420A is separated from the base piece 430A, and the base pieces 430A on both sides are brought into an electrically disconnected state. That is, the state in which the base pieces 430A on both sides of the broken portion 400A are energized via the separation piece 420A is broken, and overcurrent can be prevented from flowing through the electric circuit.

Furthermore, after the arc-extinguishing portion 533A of the mobile body 500A pushes out the separation piece 420A toward the second end 330A, the arc-extinguishing portion 533A itself is connected between the base pieces 430A so as to be replaced with the separation piece 420A. Specifically, the arc-extinguishing portion 533A moved toward the second end 330A is slidably inserted between the flat surface 432A of the pressing connection portion 431A and the end surface 433A of the base piece 430A. Even if an arc by a high voltage is generated between the base pieces 430A on both sides, the arc-extinguishing portion 533A can effectively extinguish the arc.

The arc-extinguishing portion 533A and the separation piece 420A are separate bodies, but are not limited to this, and the arc-extinguishing portion 533A and the separation piece 420A may be fixed and integrated in an adjacent state. When the arc-extinguishing portion 533A and the separation piece 420A are integrated, assembly of the electric circuit breaker device 600A becomes easier as compared with a case where the arc-extinguishing portion 533A and the separation piece 420A are separate bodies. When the arc-extinguishing portion 533A and the separation piece 420A are integrated, after the separation piece 420A is separated from the base pieces 430A, the arc-extinguishing portion 533A is smoothly switched as it is, and is reliably connected between the base pieces 430.

The mobile body 500A and the separation piece 420A are separate bodies, but are not limited to this, and the mobile body 500A and the separation piece 420A may be fixed and integrated in an adjacent state. In the known technique, since the separation piece 420A is integrally formed with the base piece 430A, when the mobile body 500A and the separation piece 420A are integrated, the mobile body 500A and the entire broken portion 400A are also integrated, and thus there is a possibility that the electric circuit breaker device becomes large in size. However, in the present application invention, since the separation piece 420A is a separate body from the base piece 430A, even if the mobile body 500A and the separation piece 420A are integrated, the mobile body 500A and the entire broken portion 400A are not integrated, and therefore there is no possibility that the electric circuit breaker device becomes large in size. Furthermore, since the assembly man-hours is reduced, reduction in assembly time can be achieved.

Third Embodiment

Figure 11:
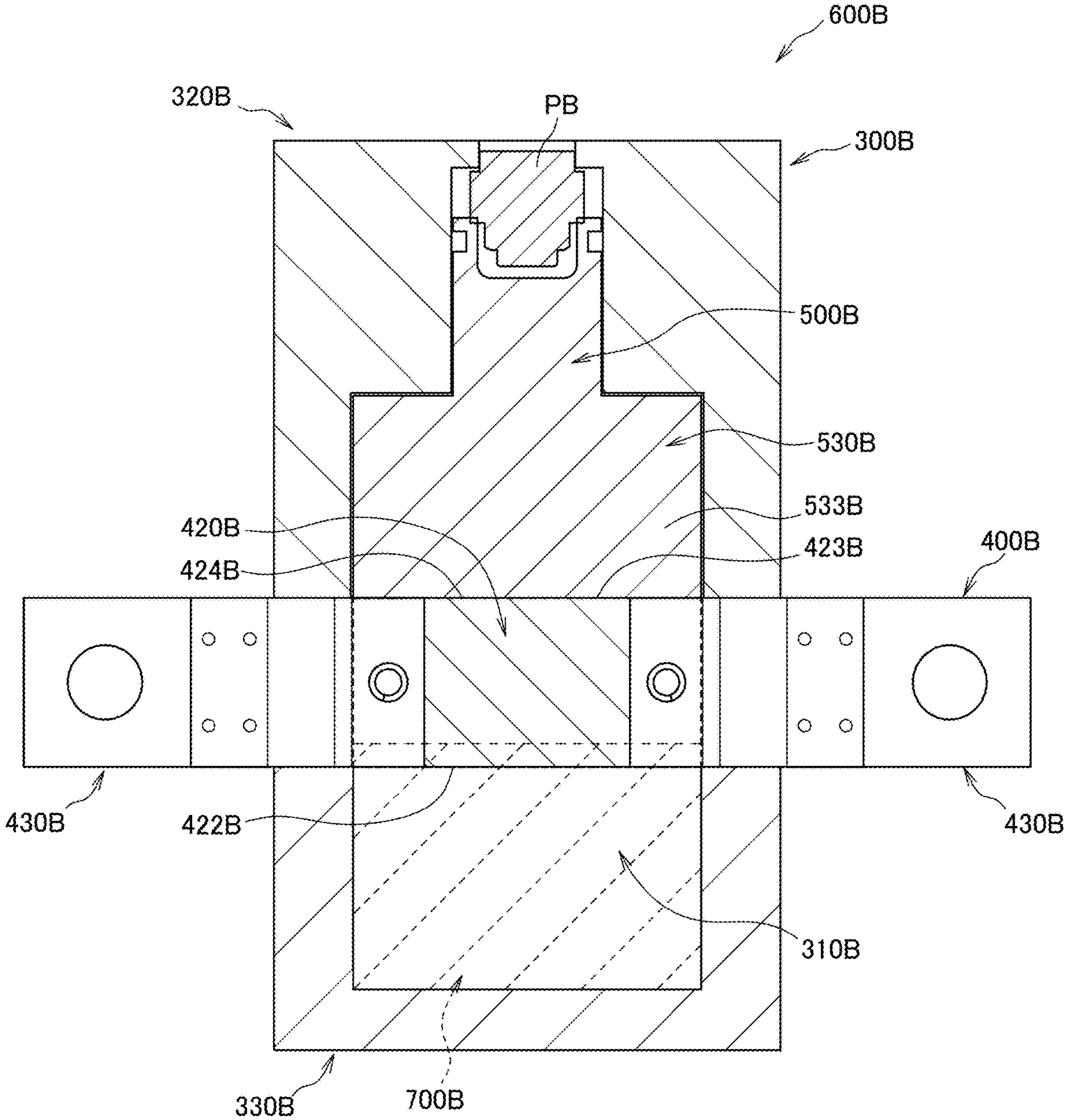
FIG. 11 illustrates a cross-sectional view of an electric circuit breaker device according to a third embodiment, similarly to FIG. 6.
Figure 12:
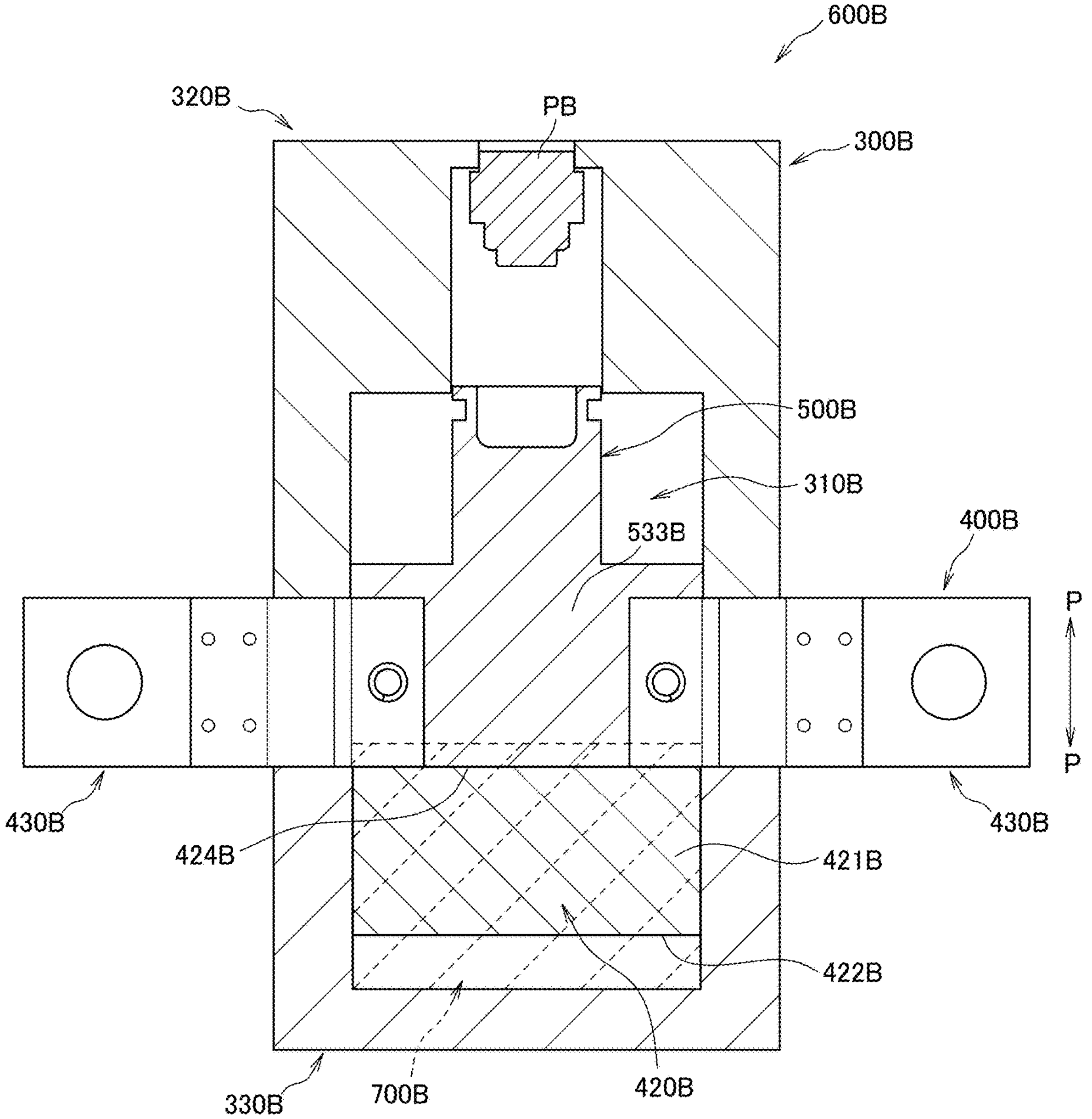
FIG. 12 is a cross-sectional view illustrating that the mobile body moves from the state illustrated in FIG. 11.

Next, an electric circuit breaker device 600B of the present invention according to the third embodiment will be described with reference to FIGS. 11 and 12. Note that FIG. 11 illustrates a cross-sectional view of the electric circuit breaker device 600B similarly to FIG. 6, and FIG. 12 is a cross-sectional view illustrating that the mobile body 500B moves from the state illustrated in FIG. 11. Note that the configuration of the electric circuit breaker device 600B according to the third embodiment is different from the configuration of the electric circuit breaker device 600A according to the second embodiment in including an arc-extinguishing material 700B, but the other configurations are basically the same as the configuration of the electric circuit breaker device 600A according to the second embodiment, and thus the description of the same configurations will be omitted.

As illustrated in FIG. 11, the base piece 430B of the broken portion 400B is connected to a part of the electric circuit, and the broken portion 400B constitutes a part of the electric circuit. In normal times, since the base piece 430B and the separation piece 420B of the broken portion 400B are not separated from each other and are physically and electrically connected to each other, current flows in the electric circuit via the base piece 430B and the separation piece 420B of the broken portion 400B.

An arc-extinguishing material 700B is accommodated on a second end 330B side of the accommodation portion 310B. This arc-extinguishing material 700B is a low-viscosity fluid arc-extinguishing material having an arc-extinguishing action, such as silicone oil or silicone gel. An end side portion 422B on the lower side (second end 330B side) of the separation piece 420B is disposed in the arc-extinguishing material 700B. On the other hand, an end side portion 423B on the upper side (first end 320B side) of the separation piece 420B is disposed above the arc-extinguishing material 700B. The end side portion 423B on the upper side of the separation piece 420B is a boundary portion with the arc-extinguishing portion 533B that is adjacent, and the end side portion 423B becomes a terminal of electrical connection with the base piece 430B, that is, a connection terminal part 424B when the separation piece 420B moves downward as described later.

Next, as illustrated in FIG. 12, when an abnormality such as overcurrent flowing through the electric circuit is detected, an abnormality signal is input to the power source PB, and the gunpowder in the power source PB explodes. Then, the mobile body 500B is vigorously blown away from the first end 320B toward the second end 330B, and instantaneously moves in the accommodation portion 310B toward the second end 330B.

Then, the arc-extinguishing portion 533B of the mobile body 500B strongly pushes out the separation piece 420B on the second end 330 side. The separation piece 420B is pushed out along the P-P axis, that is, along the extending direction of the short side of the broken portion 400B, and the separation piece 420B enters the arc-extinguishing material 700B. Then, as illustrated in FIG. 12, immediately before the separation piece 420B is separated from the base pieces 430B, the end side portion 423B on the upper side of the separation piece 420B, that is, the connection terminal part 424B is still in a state of being electrically and physically connected to the base pieces 430B on both sides. Therefore, since a high current and a high voltage are concentrated on the connection terminal part 424B, there is a possibility that heat is concentrated on or an arc is generated around the connection terminal part 424B.

However, since the separation piece 420B has moved until the connection terminal part 424B enters the arc-extinguishing material 700B, the arc generated around the connection terminal part 424B is effectively extinguished by the arc-extinguishing material 700B. Furthermore, since the separation piece 420B having a plate shape moves in a state where the side surface 421B is erected along the P-P axis, that is, along the extending direction of the short side of the broken portion 400B, the end side portion 422B side having a smaller surface area than the side surface 421B pushes toward in the arc-extinguishing material 700B. Therefore, when the separation piece 420B moves on the second end 330B side, the resistance at the time of traveling in the arc-extinguishing material 700B can be reduced as much as possible. As a result, the electric circuit can be easily broken with less power, and the size and manufacturing cost of the electric circuit breaker device can be suppressed.

Note that subsequently, the separation piece 420B moves to the bottom on the second end 330B side of the accommodation portion 310B and is completely separated from the base pieces 430B, and the base pieces 430B on both sides are brought into an electrically disconnected state. That is, the state in which the base pieces 430B on both sides of the broken portion 400B are energized via the separation piece 420B is broken, and overcurrent can be prevented from flowing through the electric circuit. The arc-extinguishing material 700B is a low-viscosity fluid arc-extinguishing material having an arc-extinguishing action, such as silicone oil or silicone gel, but is not limited to this, and a granular arc-extinguishing material or an arc-extinguishing material in another form may be accommodated in the accommodation portion 310B.

Fourth Embodiment

Figure 13:
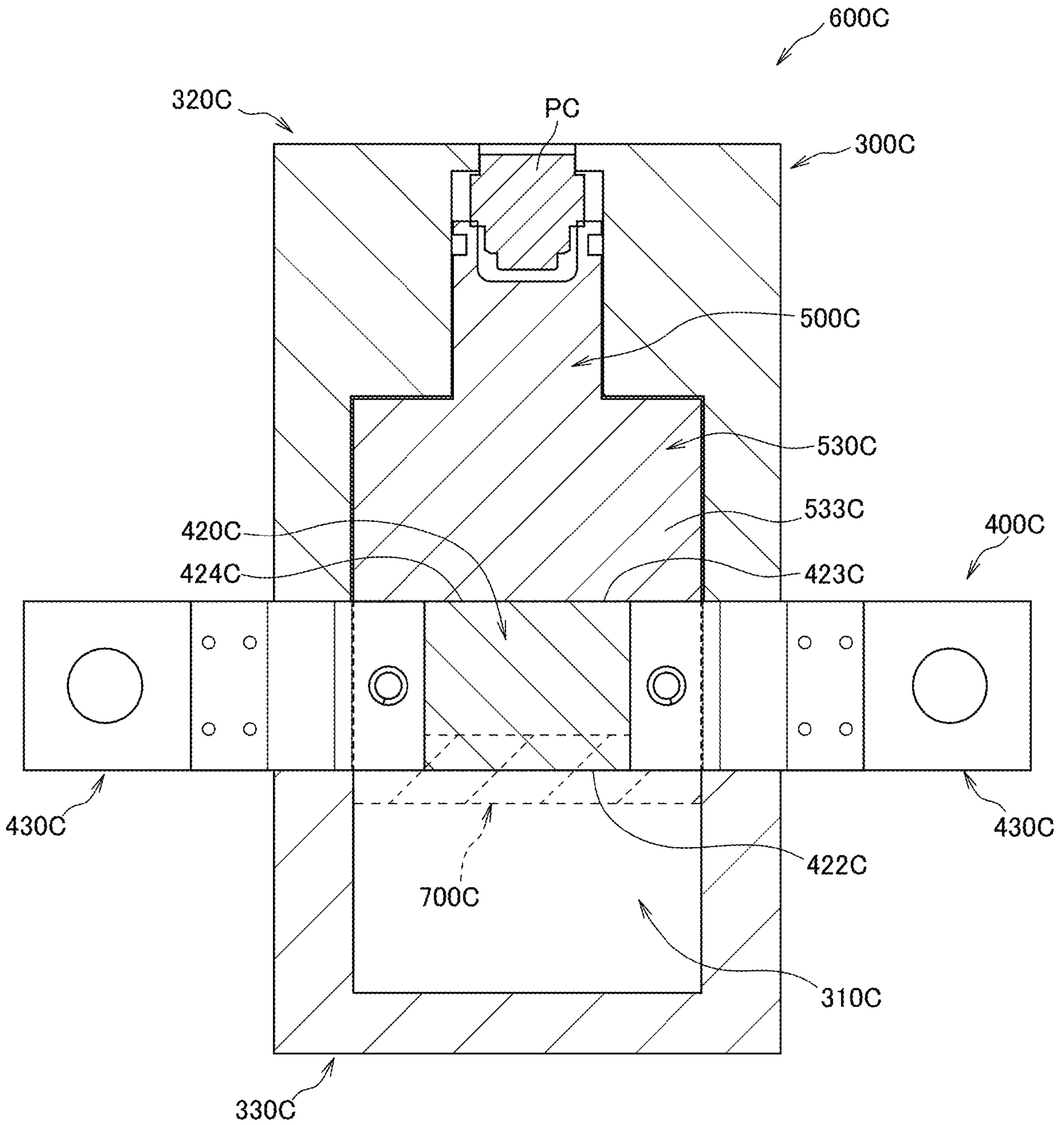
FIG. 13 illustrates a cross-sectional view of an electric circuit breaker device according to a fourth embodiment, similarly to FIG. 6.
Figure 14:
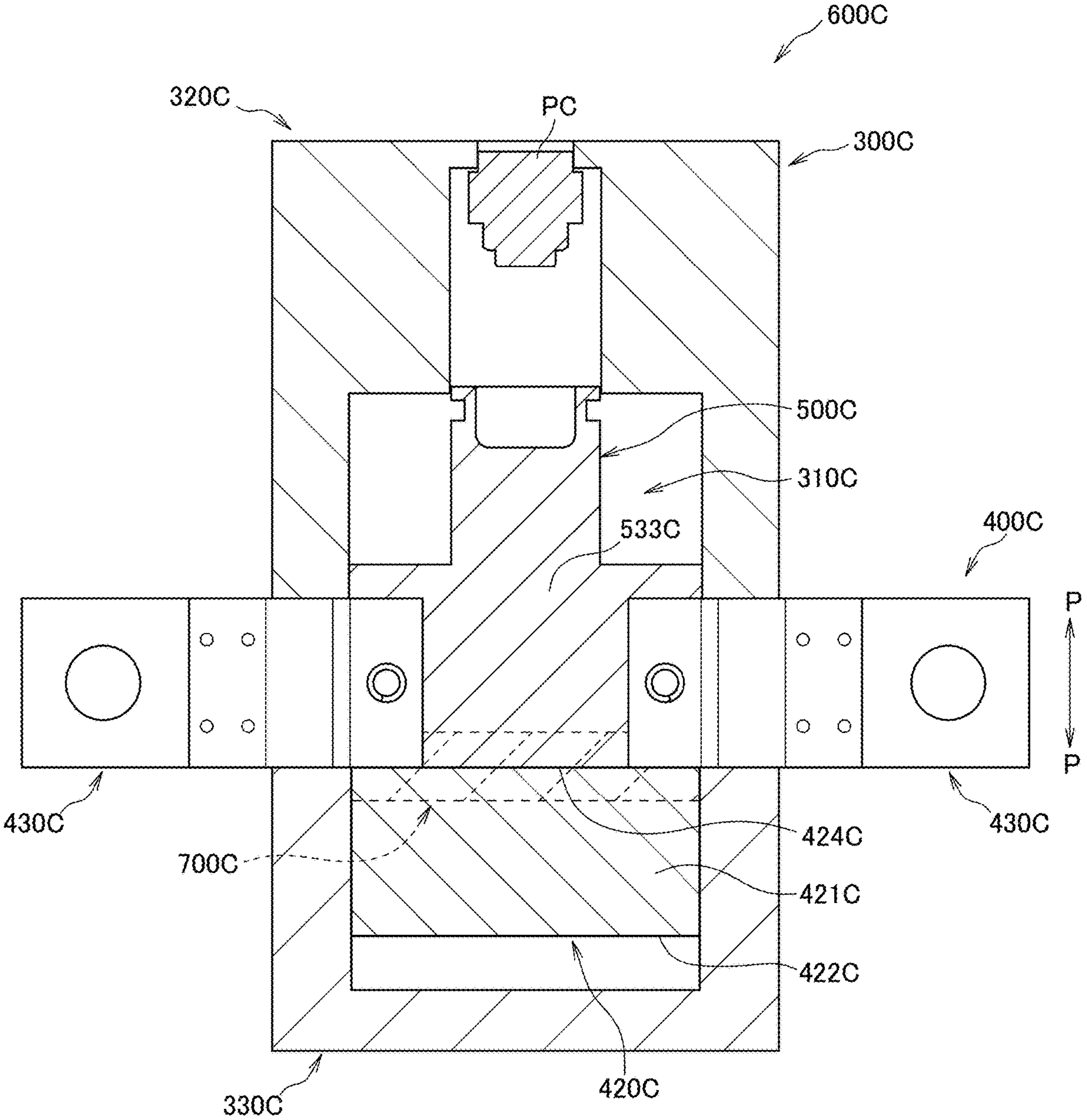
FIG. 14 is a cross-sectional view illustrating that the mobile body moves from the state illustrated in FIG. 13.

Next, an electric circuit breaker device 600C of the present invention according to the fourth embodiment will be described with reference to FIGS. 13 and 14. Note that FIG. 13 illustrates a cross-sectional view of the electric circuit breaker device 600C similarly to FIG. 6, and FIG. 14 is a cross-sectional view illustrating that the mobile body 500C moves from the state illustrated in FIG. 13. Note that the configuration of the electric circuit breaker device 600C according to the fourth embodiment is different from the configuration of the electric circuit breaker device 600A according to the second embodiment in including an arc-extinguishing material 700C, but the other configurations are basically the same as the configuration of the electric circuit breaker device 600A according to the second embodiment, and thus the description of the same configurations will be omitted.

As illustrated in FIG. 13, a base piece 430C of the broken portion 400C is connected to a part of the electric circuit, and the broken portion 400C constitutes a part of the electric circuit. In normal times, since the base piece 430C and a separation piece 420C of the broken portion 400C are not separated from each other and are physically and electrically connected to each other, current flows in the electric circuit via the base piece 430C and the separation piece 420C of the broken portion 400C.

The arc-extinguishing material 700C is installed in an accommodation portion 310C. This arc-extinguishing material 700C is a solid arc-extinguishing material made of silicone or the like. The arc-extinguishing material 700C is disposed on the front side and the back side of the separation piece 420C so as to be in contact with the periphery of an end side portion 422C on the lower side (second end 330C side) of the separation piece 420C. An end side portion 423C on the upper side (first end 320C side) of the separation piece 420C is a boundary portion with the adjacent arc-extinguishing portion 533C, and the end side portion 423C becomes a terminal of electrical connection with the base piece 430C, that is, a connection terminal part 424C when the separation piece 420C moves downward as described later.

Next, as illustrated in FIG. 14, when an abnormality such as overcurrent flowing through the electric circuit is detected, an abnormality signal is input to the power source PC, and the gunpowder in the power source PC explodes. Then, the mobile body 500C is vigorously blown away from the first end 320C toward the second end 330C, and instantaneously moves in the accommodation portion 310C toward the second end 330C.

Then, the arc-extinguishing portion 533C of the mobile body 500C strongly pushes out the separation piece 420C on the second end 330C side. The separation piece 420C is pushed out along the P-P axis, that is, along the extending direction of the short side of the broken portion 400C. Then, as illustrated in FIG. 14, immediately before the separation piece 420C is separated from the base pieces 430C, the end side portion 423C on the upper side of the separation piece 420C, that is, the connection terminal part 424C is still in a state of being electrically and physically connected to the base pieces 430C on both sides. Therefore, since a high current and a high voltage are concentrated on the connection terminal part 424C, there is a possibility that heat is concentrated on or an arc is generated around the connection terminal part 424C.

However, since the arc-extinguishing material 700C is disposed at a position in contact with connection terminal part 420C of the separation piece 424C, the arc generated around the connection terminal part 424C is effectively extinguished. The arc-extinguishing material 700C is disposed so as to be in contact with a side surface 421C of the separation piece 420C from the lateral side, and is not disposed below the end side portion 422C of the separation piece 420C. Therefore, when the separation piece 420C moves on the second end 330C side, the arc-extinguishing material 700C does not hinder movement of the separation piece 420C, and the resistance when the mobile body 500C moves can be reduced as much as possible. As a result, the electric circuit can be easily broken with less power, and the size and manufacturing cost of the electric circuit breaker device can be suppressed.

Note that subsequently, the separation piece 420C moves to the bottom on the second end 330C side of the accommodation portion 310C and is completely separated from the base pieces 430C, and the base pieces 430C on both sides are brought into an electrically disconnected state. That is, the state in which the base pieces 430C on both sides of the broken portion 400C are energized via the separation piece 420C is broken, and overcurrent can be prevented from flowing through the electric circuit. The arc-extinguishing material 700C is a solid arc-extinguishing material made of silicone or the like, but is not limited to this, and may be a granular arc-extinguishing material or an arc-extinguishing material in another form.

Fifth Embodiment

Figure 15:
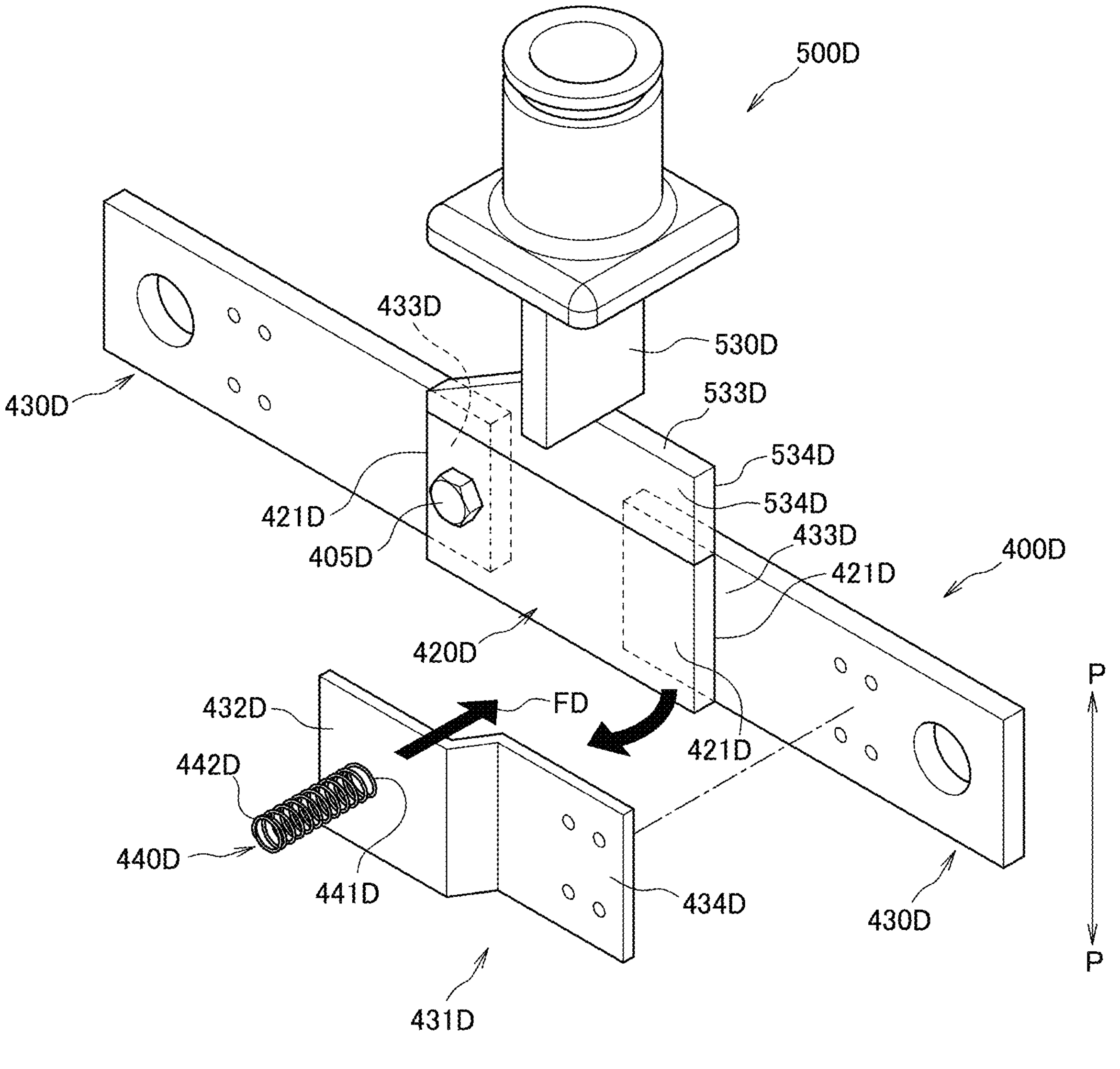
FIG. 15 is a perspective view of a broken portion and a mobile body of an electric circuit breaker device according to a fifth embodiment.

Next, an electric circuit breaker device 600D of the present invention according to the fifth embodiment will be described with reference to FIG. 15. Note that FIG. 15 is a perspective view of a broken portion 400D and a mobile body 500D of the electric circuit breaker device 600D according to the fifth embodiment. Note that the configuration of the electric circuit breaker device 600D according to the fifth embodiment is different from the configuration of the electric circuit breaker device 600 according to the first embodiment in the configuration of a broken portion 400D, but the other configurations are basically the same as the configuration of the electric circuit breaker device 600 according to the first embodiment, and thus the description of the same configurations will be omitted.

As illustrated in FIG. 15, the broken portion 400D is a conductor entirely made of metal such as copper in order to be electrically connected with the electric circuit, and includes base pieces 430D for being electrically connected with the electric circuit at both ends, and a separation piece 420D positioned between the base pieces 430D.

One base piece 430D (right side in FIG. 15) includes a pressing connection portion 431D including a pressing piece. This pressing connection portion 431D is also entirely made of a conductor made of metal such as copper in order to be electrically connected with the electric circuit. The tip end of the pressing connection portion 431D is a flat surface 432D, and the flat surface 432D is in contact with a side surface 421D on the front side of the separation piece 420D having a plate shape. Since the side surface 421D of the separation piece 420D is also a flat surface, the flat surface 432D of the pressing connection portion 431D and the side surface 421D of the separation piece 420D are in close contact with each other and are in surface contact with each other. Note that a base end 434D of the pressing connection portion 431D is fixed to the surface of the base piece 430D. An end surface 433D of the inside of the base piece 430D is a flat surface, and the end surface 433D is in contact with the side surface 421D on the back side of the separation piece 420D having a plate shape. Since the side surface 421D of the separation piece 420D is also a flat surface, the one base piece 430D and the separation piece 420D are in close contact with each other and are in surface contact with each other.

The other base piece 430D (left side in FIG. 15) is coupled and fixed to the separation piece 420D by a rotation shaft 405D. The end surface 433D of the other base piece 430D and the side surface 421D of the back surface of the separation piece 420D are in close contact with each other and are in surface contact with each other. As described later, the separation piece 420D can rotate about the rotation shaft 405D while being electrically connected to the other base piece 430D.

The flat surface 432D of the pressing connection portion 431D is attached with a compression spring 440D. Specifically, one end 441D of the compression spring 440D is attached to the flat surface 432D, and the other end 442D abuts on an inner wall of an accommodation portion 310D when the compression spring 400D is accommodated in the housing 300D. Therefore, the flat surface 432D is pressed against the separation piece 420D by a pressing force FD of the compression spring 440D. The contact surfaces of one base piece 430D and the separation piece 420D, that is, the flat surface 432D of the pressing connection portion 431D and the side surface 421D of the separation piece 420D are pressed by the pressing force FD of the compression spring 440D. Therefore, one base piece 430D and the separation piece 420D, which are separate bodies, are assembled so as to be electrically and physically connected to each other.

An upper side of the separation piece 420D is provided with an arc-extinguishing portion 533D made of an arc-extinguishing material. This arc-extinguishing portion 533D is integrally fixed to separation piece 420D, and has a plate shape similarly to separation piece 420D. A side surface 534D that is flat on the front surface side of the arc-extinguishing portion 533D is configured to be able to be brought into close contact and surface contact with the flat surface 432D of the pressing connection portion 431D when the separation piece 420D is pushed by the mobile body 500D to move downward as described later. Similarly, the side surface 534D that is flat on the back side of the arc-extinguishing portion 533D is configured to be able to be brought into close contact and surface contact with the end surface 433D of one base piece 430D. Note that the arc-extinguishing portion 533D can be made of any material as long as the material can extinguish the arc, and can be made by solidifying, for example, silicone, silica sand, or the like into a plate shape.

In normal times, since one base piece 430D and the separation piece 420D of the broken portion 400D are not separated from each other and are physically and electrically connected to each other, current flows in the electric circuit via the base pieces 430D on both sides of the broken portion 400D and the separation piece 420D.

Then, when an abnormality such as overcurrent flowing through the electric circuit is detected, a protrusion portion 530D of the mobile body 500D moved downward abuts on the upper end of the arc-extinguishing portion 533D to strongly push out the arc-extinguishing portion 533D and the separation piece 420D downward. Then, the arc-extinguishing portion 533D and the separation piece 420D are pushed out along the P-P axis, that is, along the extending direction of the short side of the broken portion 400D, and the arc-extinguishing portion 533D and the separation piece 420D rotate downward about the rotation shaft 405D. Then, the separation piece 420D is separated from one base piece 430D, and the base pieces 430D on both sides are brought into an electrically disconnected state. That is, the state in which the base pieces 430D on both sides of the broken portion 400D are energized via the separation piece 420D is broken, and overcurrent can be prevented from flowing through the electric circuit.

Furthermore, the arc-extinguishing portion 533D and the separation piece 420D rotate downward about the rotation shaft 405D, but the arc-extinguishing portion 533D disposed above the separation piece 420D is connected to one base piece 430D so as to be replaced with the separation piece 420D after this separation piece 420D is separated from one base piece 430D (right side in FIG. 15). Specifically, the arc-extinguishing portion 533D rotated downward is inserted while sliding between the flat surface 432D of the pressing connection portion 431D and the end surface 433D of the base piece 430D. Even if an arc by a high voltage is generated between the base pieces 430D on both sides, the arc-extinguishing portion 533D can effectively extinguish the arc.

Sixth Embodiment

Figure 16:
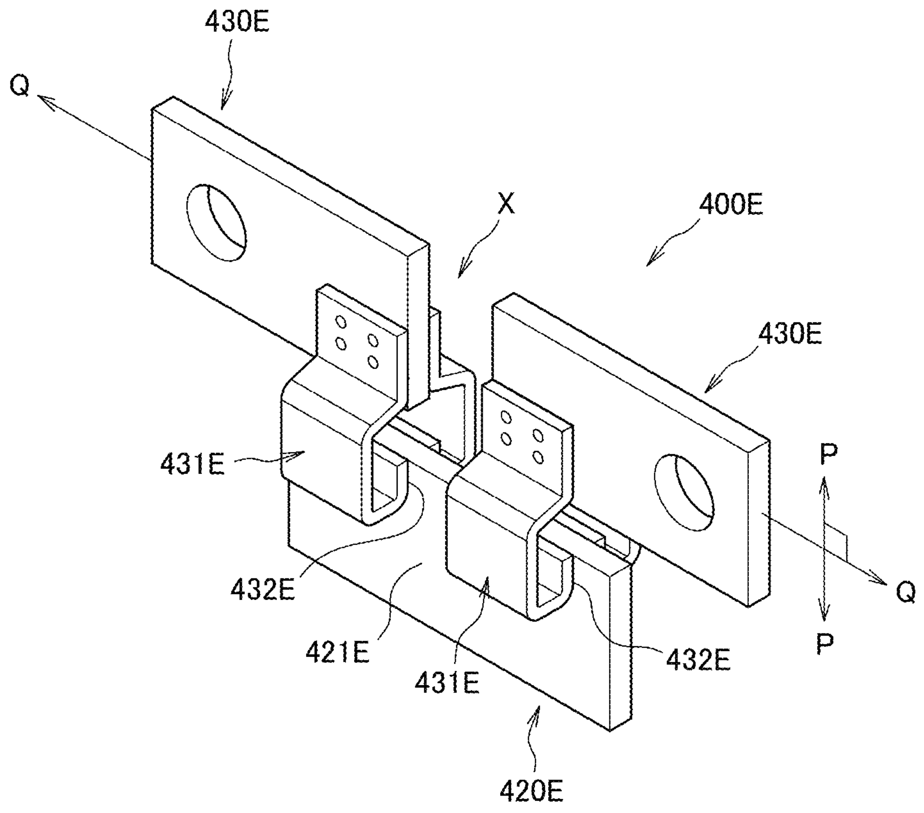
FIG. 16 is a perspective view of a broken portion of an electric circuit breaker device according to a sixth embodiment.

Next, an electric circuit breaker device 600E of the present invention according to the sixth embodiment will be described with reference to FIG. 16. Note that FIG. 16 is a perspective view of a broken portion 400E of the electric circuit breaker device 600E according to the sixth embodiment. Note that the configuration of the electric circuit breaker device 600E according to the sixth embodiment is different from the configuration of the electric circuit breaker device 600 according to the first embodiment in the configuration of a pressing connection portion 431E of the broken portion 400E, but the other configurations are basically the same as the configuration of the electric circuit breaker device 600 according to the first embodiment, and thus the description of the same configurations will be omitted.

The broken portion 400E is a conductor entirely made of metal such as copper in order to be electrically connected with the electric circuit, and includes base pieces 430E for being electrically connected with the electric circuit at both ends, and a separation piece 420E. The base piece 430E includes a pressing connection portion 431E including a pair of holding pieces. This pressing connection portion 431E has basically the same configuration as that of the pressing connection portion 431 according to the first embodiment illustrated in FIG. 4, but is different in the orientation of attachment. Specifically, the pressing connection portion 431E faces downward, and the pressing connection portion 431E holds the separation piece 420E from both sides of the separation piece 420E so that the separation piece 420E is disposed below the base piece 430E. Therefore, the base piece 430E and the separation piece 420E, which are separate bodies, are assembled so as to be electrically and physically connected to each other.

The broken portion 400E has a long plate shape as a whole, and the short direction of the broken portion 400E is a direction along the P-P axis perpendicular to the long axis Q-Q extending along the long direction of the broken portion 400E. Then, when an abnormality such as overcurrent flowing through the electric circuit is detected, the separation piece 420E is strongly pushed out downward by the mobile body, and the separation piece 420E moves along the P-P axis, that is, along the extending direction of the short side of the broken portion 400E and is separated from the base piece 430E. At this time, the separation piece 420E moves, in contact with the base piece 430E, along the contact surfaces of the base piece 430E and the separation piece 420E (the contact surfaces of a flat surface 432E of the pressing connection portion 431E and a side surface 421E of the separation piece 420E). Note that the protrusion portion of the mobile body moves through a gap X between the base pieces 430E on both sides to push out the separation piece 420E downward.

Seventh Embodiment

Next, an electric circuit breaker device 600F of the present invention according to the seventh embodiment will be described with reference to FIG. 17(*a*). Note that FIG. 17(*a*) is a perspective view of a broken portion 400F of the electric circuit breaker device 600F according to the seventh embodiment. Note that the configuration of the electric circuit breaker device 600F according to the seventh embodiment is different from the configuration of the electric circuit breaker device 600 according to the first embodiment in the configuration of a base piece 430E of the broken portion 400F, but the other configurations are basically the same as the configuration of the electric circuit breaker device 600 according to the first embodiment, and thus the description of the same configurations will be omitted.

The broken portion 400F is a conductor entirely made of metal such as copper in order to be electrically connected with the electric circuit, and includes base pieces 430F for being electrically connected with the electric circuit at both ends, and a separation piece 420F. The base piece 430F includes a pressing connection portion 431F cut into a groove shape. The width of the groove portion of the pressing connection portion 431F is slightly narrower than the thickness of the separation piece 420F. Therefore, when the separation piece 420F is inserted into the pressing connection portion 431F, the pressing connection portion 431F holds the separation piece 420F from both sides of the separation piece 420F.

A holding surface of the inside of the pressing connection portion 431F is a flat surface 432F, and the flat surface 432F is in contact with the side surface 421F of the separation piece 420F having a plate shape. In particular, since the side surface 421F of the separation piece 420F is also a flat surface, the flat surface 432F of the pressing connection portion 431F and the side surface 421F of the separation piece 420F are in close contact with each other and are in surface contact with each other. The contact surfaces of the base piece 430F and the separation piece 420F, that is, the flat surface 432F of the pressing connection portion 431F and the side surface 421F of the separation piece 420F are pressed by a pressing force FF by which the pressing connection portion 431F holds the separation piece 420F. Therefore, the base piece 430F and the separation piece 420F, which are separate bodies, are assembled so as to be electrically and physically connected to each other.

In particular, since the pressing force FF is applied to the contact surfaces of the base piece 430F and the separation piece 420F, the contact resistance of the contact surfaces of the base piece 430F and the separation piece 420F (the contact surfaces of the flat surface 432F of the pressing connection portion 431F and the side surface 421F of the separation piece 420F) can be suppressed to be low, and further, that state can be maintained for a long period of time.

In a state where the separation piece 420F is assembled to the base piece 430F, the broken portion 400F has a long plate shape as a whole, and the short direction of the broken portion 400F is a direction along the P-P axis perpendicular to the long axis Q-Q extending along the long direction of the broken portion 400F. Then, when an abnormality such as overcurrent flowing through the electric circuit is detected, the separation piece 420F is strongly pushed out downward by the mobile body, and the separation piece 420F moves along the P-P axis, that is, along the extending direction of the short side of the broken portion 400F and is separated from the base piece 430F. At this time, the separation piece 420F moves, in contact with the base piece 430F, along the contact surfaces of the base piece 430F and the separation piece 420F (the contact surfaces of the flat surface 432F of the pressing connection portion 431F and the side surface 421F of the separation piece 420F).

Eighth Embodiment

Next, an electric circuit breaker device 600G of the present invention according to the eighth embodiment will be described with reference to FIG. 17(*b*). Note that FIG. 17(*b*) is a perspective view of a broken portion 400G of the electric circuit breaker device 600G according to the eighth embodiment. Note that the configuration of the electric circuit breaker device 600G according to the eighth embodiment is different from the configuration of the electric circuit breaker device 600F according to the seventh embodiment in that a separation piece 420G of the broken portion 400G includes a pressing connection portion 426G, but the other configurations are basically the same as the configuration of the electric circuit breaker device 600F according to the seventh embodiment, and thus the description of the same configurations will be omitted.

Figure 17A:
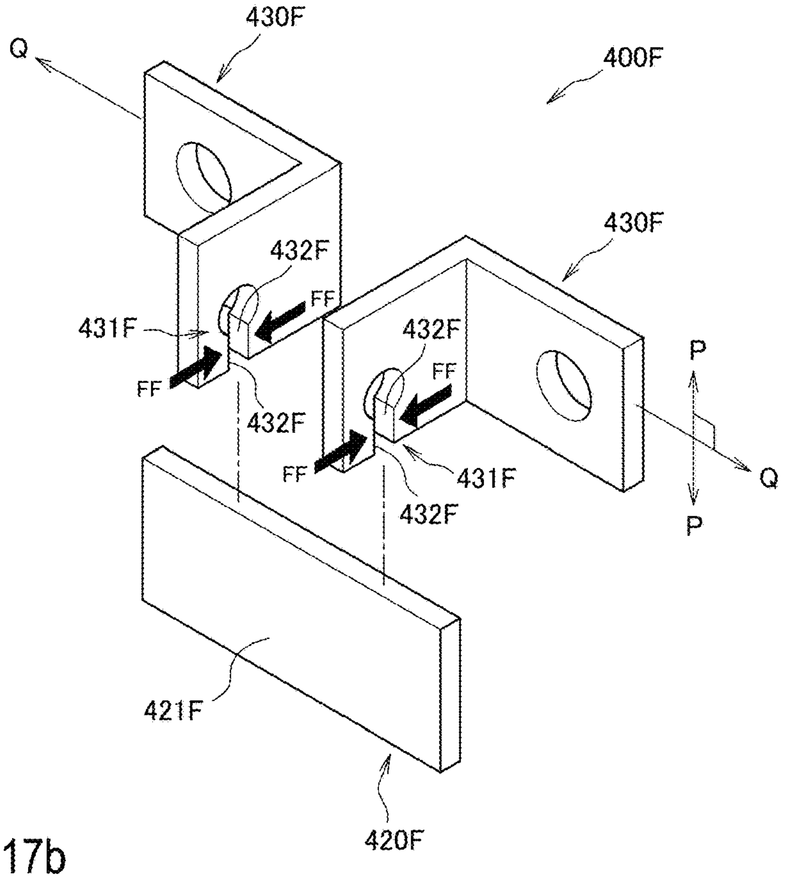
FIG. 17(*a*) is a perspective view of a broken portion of an electric circuit breaker device according to a seventh embodiment, and (b) is a perspective view of a broken portion of an electric circuit breaker device according to an eighth embodiment.
Figure 17B:
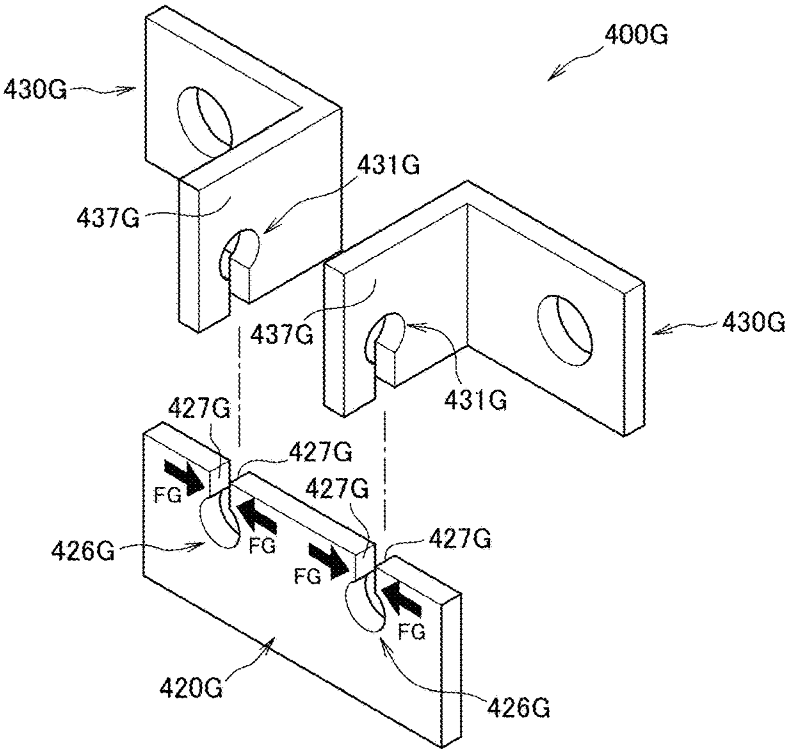

As illustrated in FIG. 17(*b*), the separation piece 420G of the broken portion 400G is also provided with the pressing connection portion 426G cut into a groove shape. The width of the groove portion of the pressing connection portion 426G is slightly narrower than the thickness of the base piece 430G. Therefore, when the pressing connection portion 426G is inserted into the base piece 430G, the pressing connection portion 426G holds the base piece 430G from both sides of the base piece 430G. The holding surface of the inside of the pressing connection portion 426G is a flat surface 427G, and the flat surface 427G and a side surface 437G that is flat of the base piece 430G are in close contact with each other and are in surface contact with each other. The contact surfaces of the base piece 430G and the separation piece 420G, that is, the side surface 437G of the base piece 430G and the flat surface 427G of the pressing connection portion 426G are pressed by a pressing force FG by which the pressing connection portion 426G holds the base piece 430G. Therefore, the base piece 430G and the separation piece 420G, which are separate bodies, are assembled so as to be electrically and physically connected to each other.

In particular, since the pressing force FG is applied to the contact surfaces of the base piece 430G and the separation piece 420G, the contact resistance of the contact surfaces of the base piece 430G and the separation piece 420G (the contact surfaces of the side surface 437G of the base piece 430G and the flat surface 427G of the pressing connection portion 426G) can be suppressed to be low, and further, that state can be maintained for a long period of time.

Ninth Embodiment

Next, an electric circuit breaker device 600H of the present invention according to the ninth embodiment will be described with reference to FIG. 18. Note that FIG. 18(*a*) is a perspective view of a broken portion 400H of the electric circuit breaker device 600H according to the ninth embodiment, and FIG. 18(*b*) is a perspective view of the broken portion 400H and a mobile body 500H of the electric circuit breaker device 600H according to the ninth embodiment. Note that the configuration of the electric circuit breaker device 600H according to the ninth embodiment is different from the configuration of the electric circuit breaker device 600 according to the first embodiment in the configuration of a broken portion 400H, but the other configurations are basically the same as the configuration of the electric circuit breaker device 600 according to the first embodiment, and thus the description of the same configurations will be omitted.

Figure 18A:
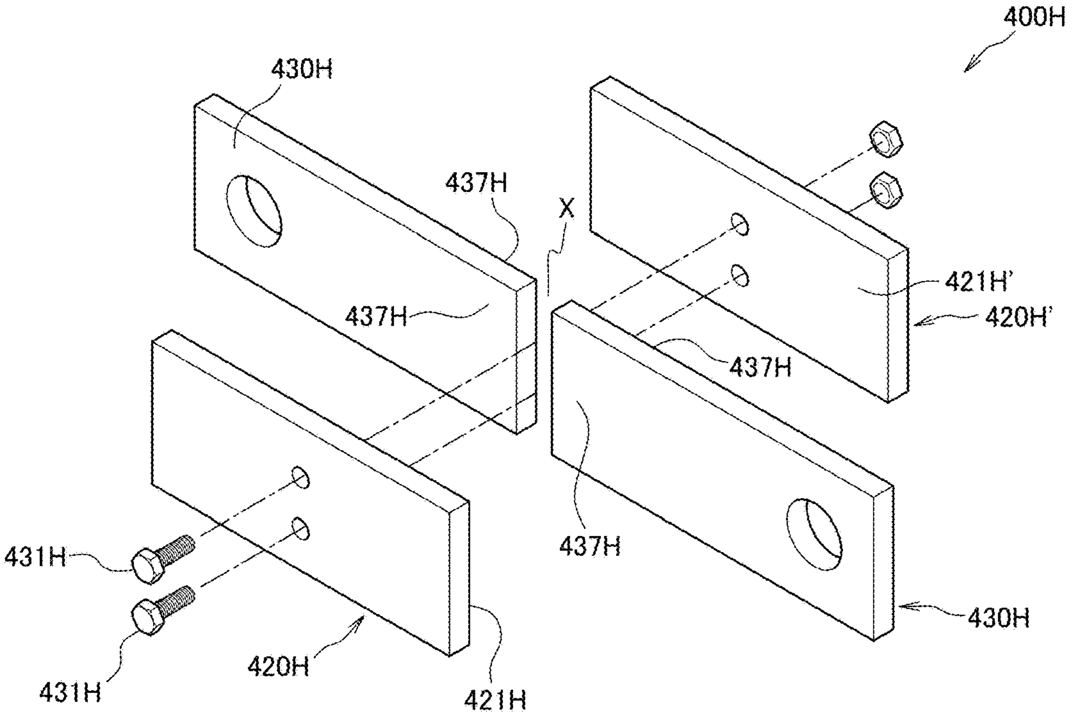
FIG. 18(*a*) is a perspective view of a broken portion of an electric circuit breaker device according to a ninth embodiment, and (b) is a perspective view of the broken portion and a mobile body of the electric circuit breaker device according to the ninth embodiment.
Figure 18B:
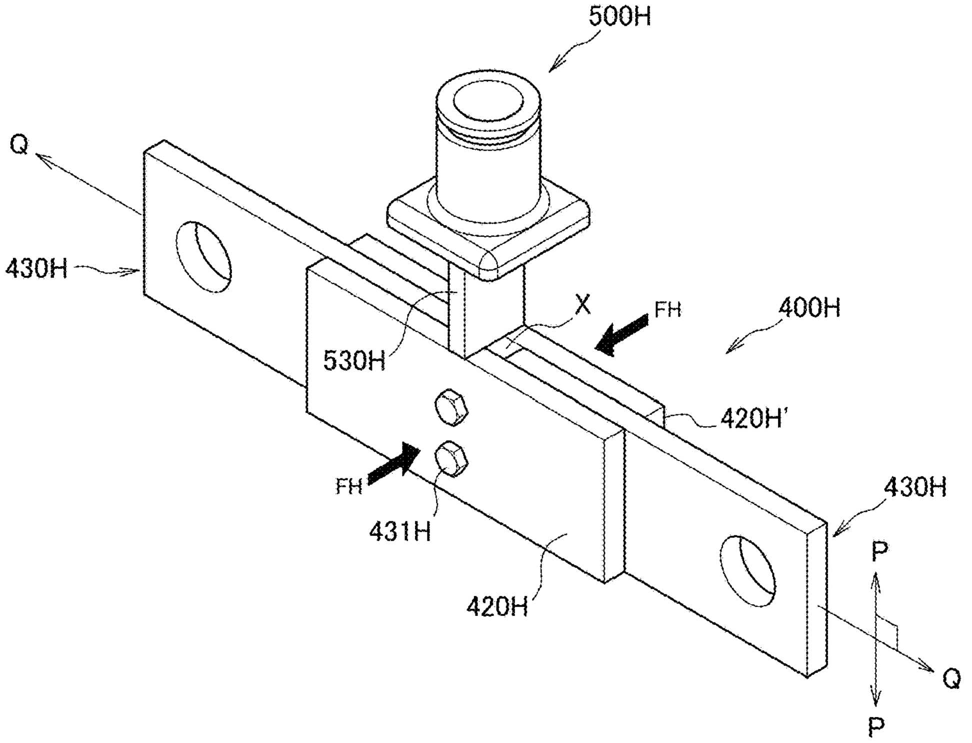

As illustrated in FIG. 18(*a*), the broken portion 400H is a conductor entirely made of metal such as copper in order to be electrically connected with the electric circuit, and includes base pieces 430H for being electrically connected with the electric circuit at both ends, and a pair of separation pieces (separation piece 420H and the separation piece 420H'). Then, this pair of separation pieces (separation piece 420H and separation piece 420H') is attached so as to be held from both sides of the base piece 430H. Specifically, a pressing connection portion 431H such as a screw or a rivet is caused to penetrate the gap X between the base pieces 430H on both sides, thereby coupling and fixing the pair of separation pieces (separation piece 420H and separation piece 420H') to each other. Then, the pressing connection portion 431H is strongly fastened, whereby as illustrated in FIG. 18(*b*), the pair of separation pieces (separation piece 420H and separation piece 420H') is brought into a state of holding the base piece 430H from both sides by a pressing force FH. Due to this, the base piece 430H and the separation piece (separation piece 420H and separation piece 420H'), which are separate bodies, are assembled so as to be electrically and physically connected to each other.

A side surface 421H that is flat of the separation piece 420H is in close contact and surface contact with a side surface 437H that is flat on the front side of the base piece 430H, and a side surface 421H' that is flat of the separation piece 420H' is also in close contact and surface contact with the side surface 437H that is flat on the back side of the base piece 430H. Therefore, the contact area of the separation piece and the base piece is doubled in the case of connecting two separation pieces (separation piece 420H and separation piece 420H') in surface contact with the base piece 430H, as illustrated in FIG. 18, as compared with the case of connecting one separation piece in surface contact with the base piece. In this manner, since the contact area can be doubled, the contact resistance can be reduced to about half. Since the pair of separation pieces (separation piece 420H and separation piece 420H') having a plate shape is configured to be held from both sides of the base piece 430H, the arrangement space of the pair of separation pieces (separation piece 420H and separation piece 420H') can be reduced, and it is possible to suppress an increase in size and manufacturing cost of the electric circuit breaker device.

Since the pressing force FH is applied to the contact surfaces of the base piece 430H and the pair of separation pieces (separation piece 420H and the separation piece 420H'), the contact resistance of the contact surfaces of the base piece 430H and the pair of separation pieces (separation piece 420H and the separation piece 420H') can be suppressed to be low, and further, that state can be maintained for a long period of time. Since the pair of separation pieces (separation piece 420H and separation piece 420H') is configured to be tightened in the direction of approaching each other by the pressing connection portion 431H such as a screw or a rivet, the pressing force FH that is strong can be generated with a simple configuration, and the contact resistance can be further suppressed to be low. Note that the pressing connection portion 431H is not limited to a screw, a rivet, or the like, and any means may be adopted as long as it is configured to tighten the pair of separation pieces (separation piece 420H and separation piece 420H') in a direction approaching each other.

In a state where the pair of separation pieces (separation piece 420H and separation piece 420H') is assembled to the base piece 430H, the broken portion 400H has a long plate shape as a whole, and the short direction of the broken portion 400H is a direction along the P-P axis perpendicular to the long axis Q-Q extending along the long direction of the broken portion 400H. Then, when an abnormality such as overcurrent flowing through the electric circuit is detected, a protrusion portion 530H of the mobile body 500H moved downward strongly pushes out the pair of separation pieces (separation piece 420H and separation piece 420H') downward while passing through the gap X between the base pieces 430H. Then, the pair of separation pieces (separation piece 420H and separation piece 420H') coupled by the pressing connection portion 431H moves along the P-P axis, that is, along the extending direction of the short side of the broken portion 400H and is separated from the base piece 430H. At this time, the pair of separation pieces (separation piece 420H and separation piece 420H') moves, in contact with the base piece 430H, along the contact surfaces of the base piece 430H and the pair of separation pieces (separation piece 420H and separation piece 420H').

Tenth Embodiment

Figure 19A:
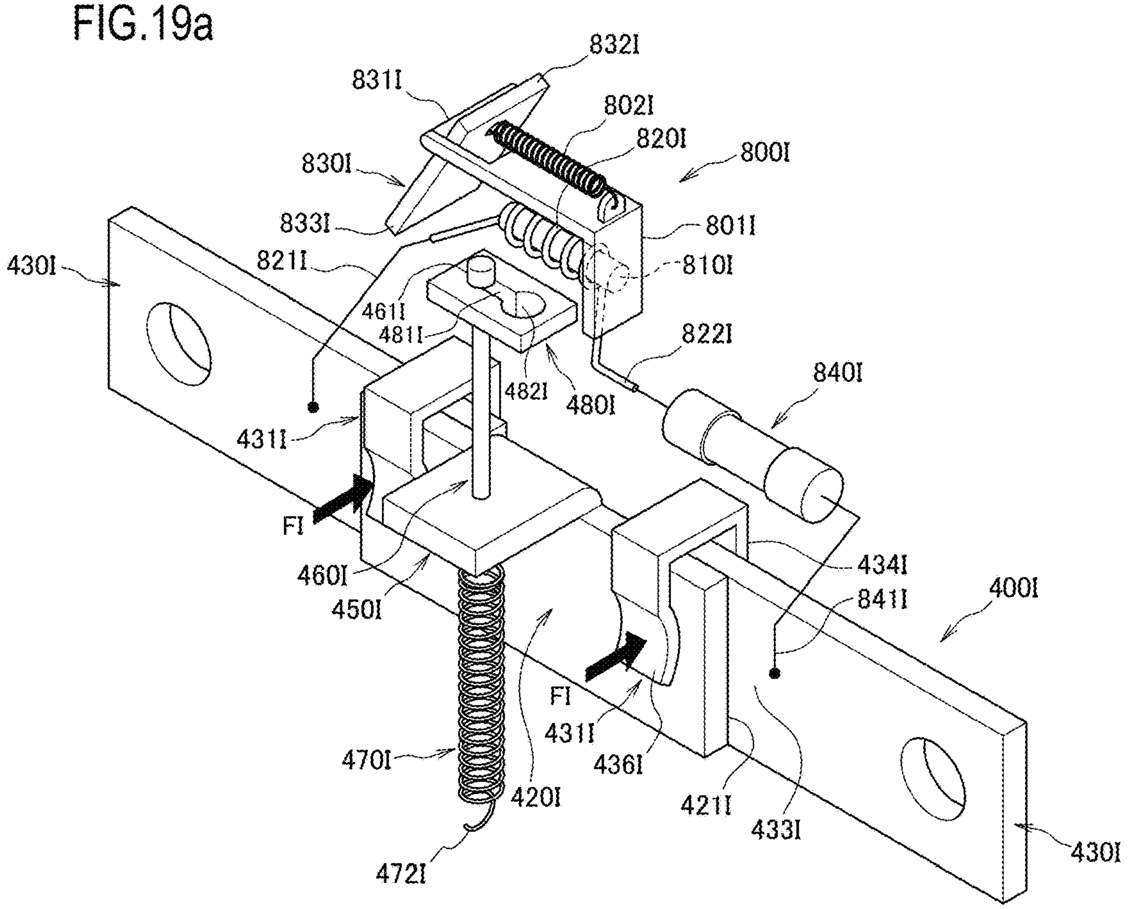
FIG. 19 is a perspective view of a broken portion of an electric circuit breaker device according to a tenth embodiment and an electromagnetic coil type trip device.
Figure 19B:
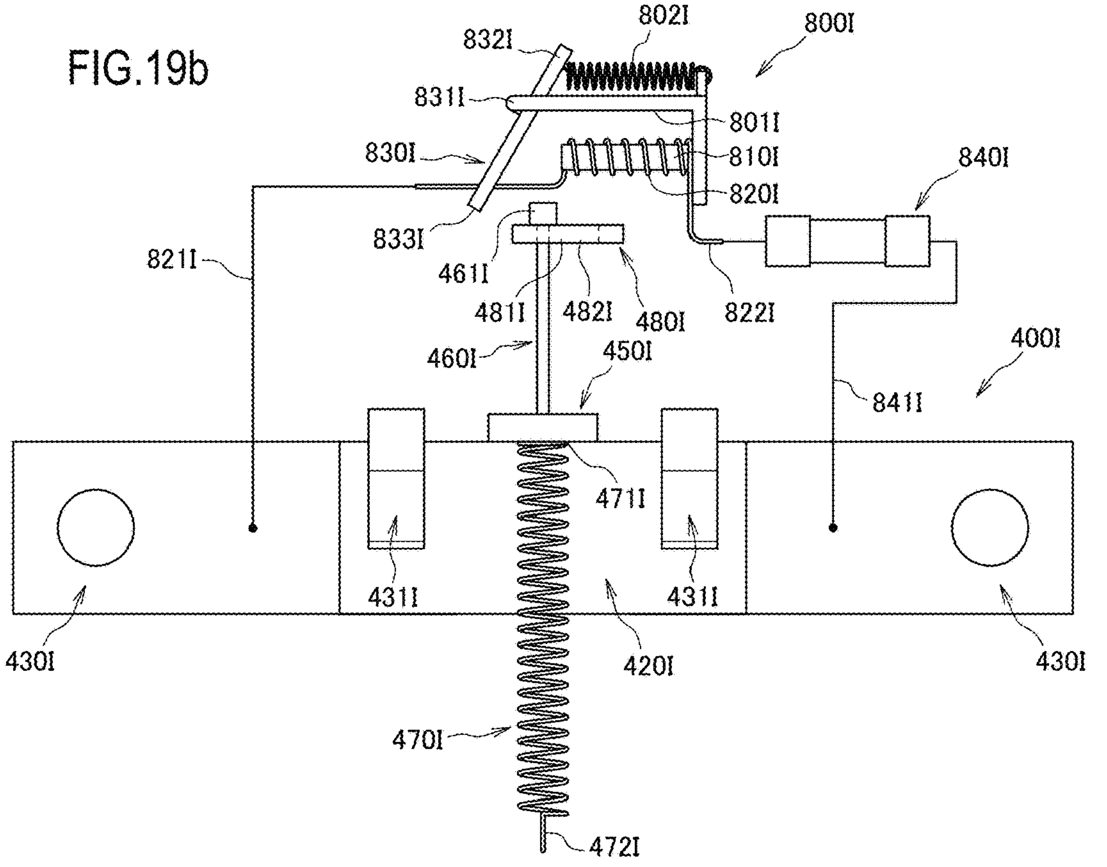
Figure 20:
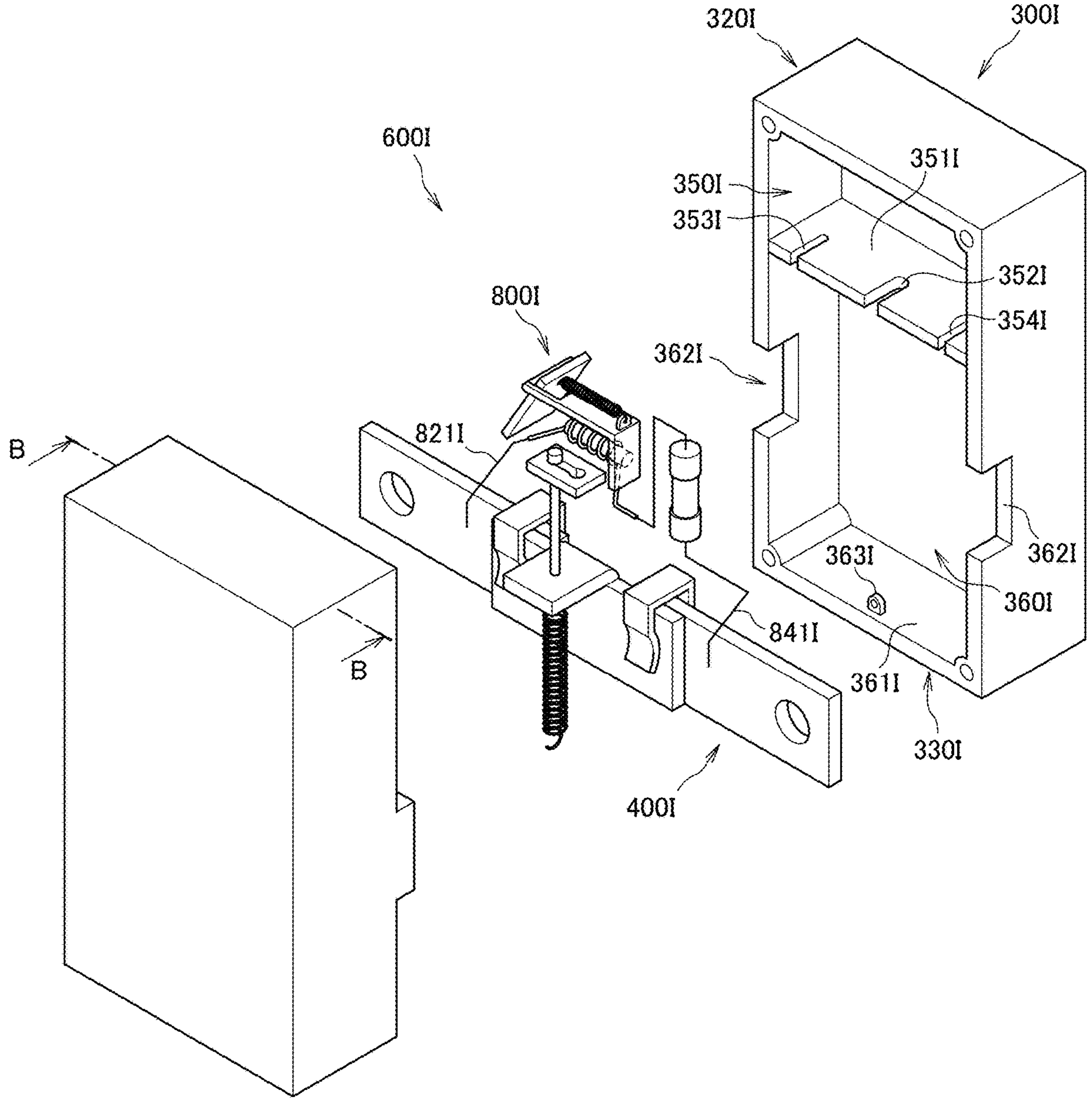
FIG. 20 is an exploded perspective view of the electric circuit breaker device according to the tenth embodiment.
Figure 21:
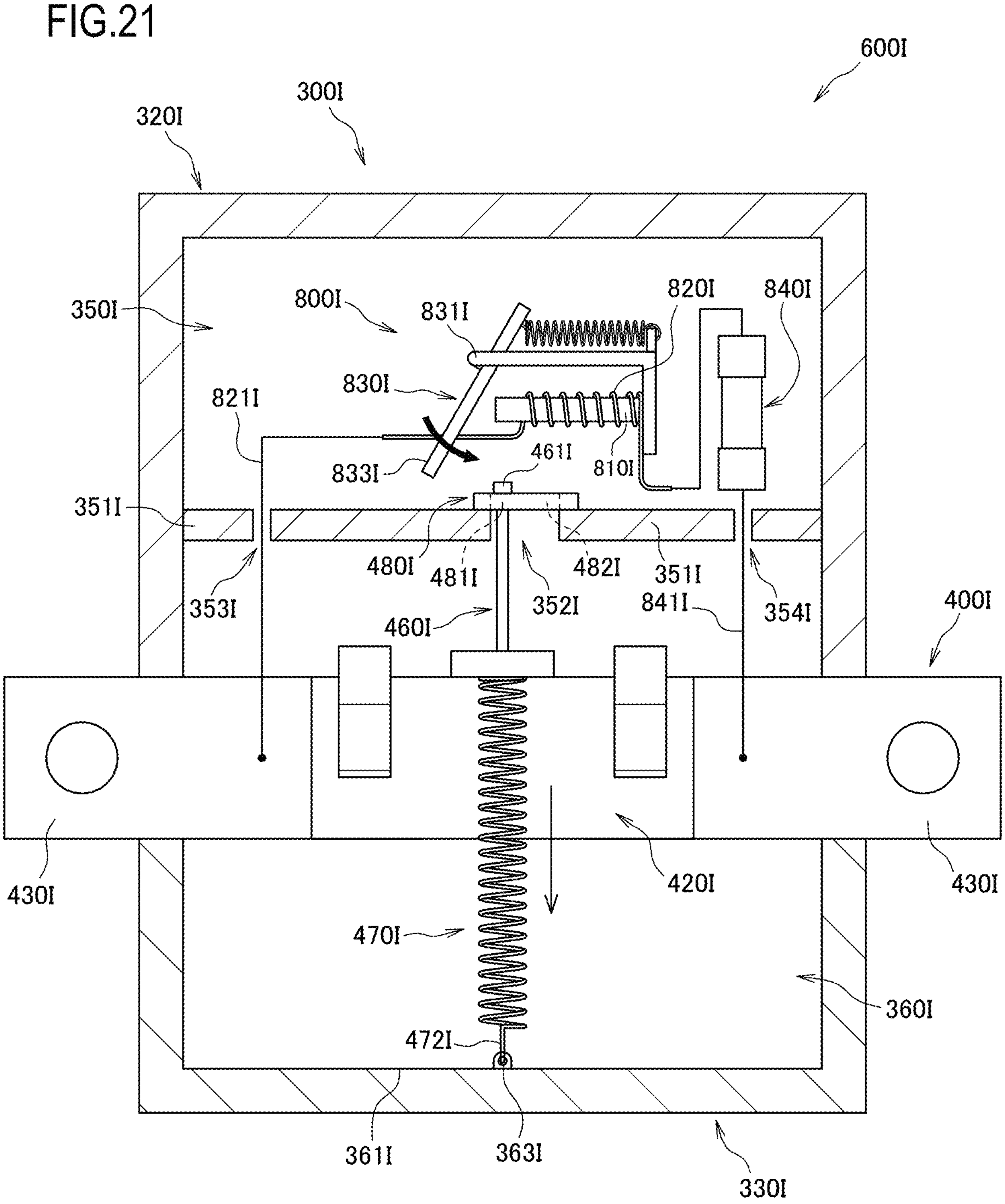
FIG. 21 is a cross-sectional view taken along line B-B in a state where the electric circuit breaker device illustrated in FIG. 20 is assembled.
Figure 22:
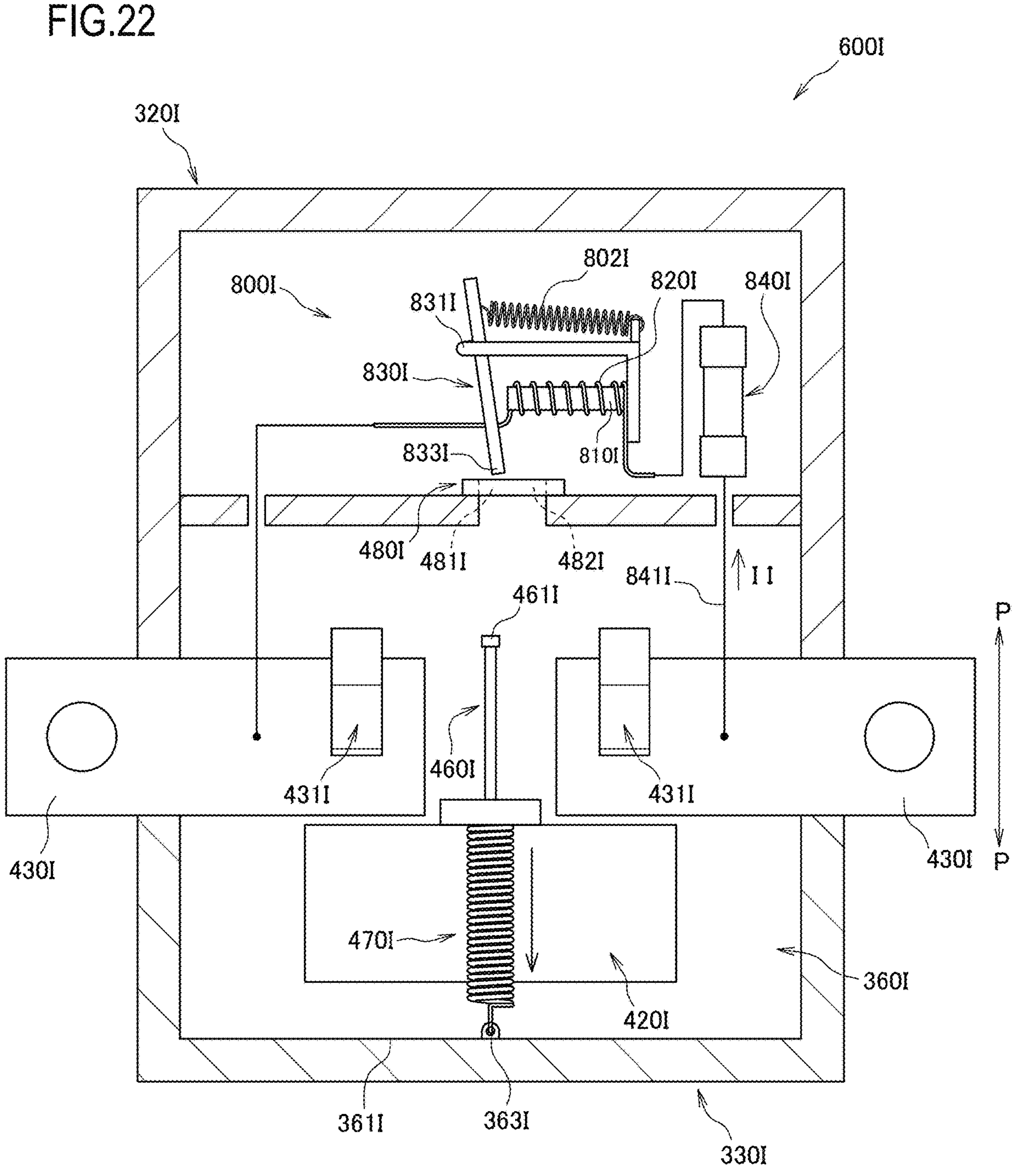
FIG. 22 is a cross-sectional view of a state in which a separation piece is separated from the state of FIG. 21.

Next, an electric circuit breaker device 600I of the present invention according to the tenth embodiment will be described with reference to FIGS. 19 to 22. Note that FIG. 19 is a perspective view of a broken portion 400I of the electric circuit breaker device 600I according to the tenth embodiment and an electromagnetic coil type trip device 800I, FIG. 20 is an exploded perspective view of the electric circuit breaker device 600I according to the tenth embodiment, FIG. 21 is a cross-sectional view taken along line B-B in a state where the electric circuit breaker device 600I illustrated in FIG. 20 is assembled, and FIG. 22 is a cross-sectional view in a state where a separation piece 420I is separated from the state of FIG. 21. Note that the configuration of the electric circuit breaker device 600I according to the tenth embodiment is different from the configuration of the electric circuit breaker device 600 according to the first embodiment in the configuration of a pressing connection portion 431I of the broken portion 400I, inclusion of an electromagnetic coil type trip device 800I and a tension spring 470I in place of the mobile body 500 and the power source P, and the configuration of a housing 300I, but the other configurations are basically the same as the configuration of the electric circuit breaker device 600 according to the first embodiment, and thus the description of the same configurations will be omitted.

As illustrated in FIG. 19, the broken portion 400I is a conductor entirely made of metal such as copper in order to be electrically connected with the electric circuit, and includes base pieces 430I for being electrically connected with the electric circuit at both ends, and a separation piece 420I positioned between the base pieces 430I. The base piece 430I includes a pressing connection portion 431I having a leaf spring shape, and this pressing connection portion 431I holds the separation piece 420I and the base piece 430I. More specifically, a base end 434I of the pressing connection portion 431I is fixed to an end surface 433I of the base piece 430I, and a tip end 436I holds the separation piece 420I by superposing and pressing it on the base piece 430I. A side surface 421I that is flat of the back surface of the separation piece 420I and the flat end surface 433I of the base piece 430I are in close contact with each other and are in surface contact with each other. The contact surfaces of the base piece 430I and the separation piece 420I, that is, the end surface 433I of the base piece 430I and the side surface 421I of the separation piece 420I are pressed by a pressing force FI by which the pressing connection portion 431I holds the separation piece 420I. Therefore, the base piece 430I and the separation piece 420I, which are separate bodies, are assembled so as to be electrically and physically connected to each other.

In particular, since the pressing force FI is applied to the contact surfaces of the base piece 430I and the separation piece 420I, the contact resistance of the contact surfaces of the base piece 430I and the separation piece 420I (the contact surfaces of the end surface 433I of the base piece 430I and the side surface 421I of the separation piece 420I) can be suppressed to be low, and further, that state can be maintained for a long period of time.

The electric circuit breaker device 600I of the present application invention according to the tenth embodiment includes the electromagnetic coil type trip device 800I and the tension spring 470I as a power mechanism that moves the separation piece 420 as described in the first embodiment, that is, a power mechanism that moves the separation piece 420I in place of the power source P. This electromagnetic coil type trip device 800I uses an existing principle used conventionally, and the configuration of the electromagnetic coil type trip device 800I will be described in detail. Specifically, the electromagnetic coil type trip device 800I includes a fixed iron core 810I, a coil 820I wound around the fixed iron core 810I, and an operating iron piece 830I. One end 821I of the coil 820I is electrically connected to one base piece 430I (left side in FIG. 19), and an other end 822I of the coil 820I is electrically connected to a fuse 840I. Furthermore, the fuse 840I is electrically connected to the other base piece 430I (right side in FIG. 19) by an electric wire 841I. In this manner, the base pieces 430I on both sides are electrically connected to the coil 820I via the fuse 840I. Note that the power mechanism includes the power source P, or the electromagnetic coil type trip device 800I and the tension spring 470I, but is not limited to this, and any configuration can be adopted as long as the separation piece can be moved.

The operating iron piece 830I is pivotally supported by a base 801I by a rotation shaft 831I, and the operating iron piece 830I can rotate about the rotation shaft 831I. Since a terminal 832I of the operating iron piece 830I is pulled by a tension spring 802I fixed to the base 801I, a tip end 833I on the opposite side of the terminal 832I is separated from a head 461I of a shaft 460I.

The separation piece 420I is attached with an attachment portion 450I to which the shaft 460I and the tension spring 470I are coupled. The head 461I of the shaft 460I is locked to a fixing plate 480I fixed to the housing 300I described later. Specifically, the fixing plate 480I includes a locking hole 481I narrower in width than the head 461I and an insertion hole 482I wider in width than the head 461I. This locking hole 481I and the insertion hole 482I are continuous, and as described later, the state can be changed from a state in which the head 461I is locked around the locking hole 481I to a state in which the head 461I moves to the insertion hole 482I and the head 461I slips downward through the insertion hole 482I and comes off. One end 471I of the tension spring 470I is fixed to the attachment portion 450I attached to the separation piece 420I, and the other end 472I is fixed to a part of the housing 300I.

Next, an aspect in which the electromagnetic coil type trip device 800I and the broken portion 400I are accommodated in the housing 300I will be described with reference to FIGS. 20 and 21. The housing 300I includes a divided housing piece divided into front and rear, and the electromagnetic coil type trip device 800I and the broken portion 400I can be accommodated and sealed in the divided housing piece. Specifically, the electromagnetic coil type trip device 800I is accommodated in an upper accommodation portion 350I on a first end 320I side. A lower wall part 351I of the upper accommodation portion 350I is provided with a through hole 352I through which the head 461I of the shaft 460I can be inserted. The fixing plate 480I is fixed to the lower wall part 351I such that the locking hole 481 and the insertion hole 482I of the fixing plate 480I overlap the through hole 352I. Furthermore, the lower wall part 351I is provided with a through hole 353I through which the end 821I of the coil 820I is inserted and a through hole 354I through which the electric wire 841I of the fuse 840I is inserted.

Furthermore, the broken portion 400I is accommodated in the lower accommodation portion 360I on the second end 330I side. Both sides of the lower accommodation portion 360I are provided with through holes 362I through which the base pieces 430I of the broken portion 400I can be inserted, and the broken portion 400I is accommodated by being supported by the through holes 362I on the both sides so as to cross the lower accommodation portion 360I. The lower wall part 361I of the lower accommodation portion 360I is provided with a fixing portion 363I that fixes the end 472I of the tension spring 470I.

The electric circuit breaker device 600I is used by being attached in an electric circuit desired to protect. Specifically, the base piece 430I of the broken portion 400I is connected to a part of the electric circuit, and the broken portion 400I constitutes a part of the electric circuit. In normal times, since the base piece 430I and the separation piece 420I of the broken portion 400I are not separated from each other and are physically and electrically connected to each other, current flows in the electric circuit via the base piece 430I and the separation piece 420I of the broken portion 400I. Note that although by the tension spring 470I, the tensile force pulling toward the second end 330I acts on the separation piece 420I, the head 461I of the shaft 460I fixed to the separation piece 420I is engaged with the fixing plate 480I, and therefore the separation piece 420I does not move toward the second end 330I.

Next, a state in which the electric circuit breaker device 600I breaks the electric circuit when an abnormality such as overcurrent flowing through the electric circuit occurs will be described. When overcurrent exceeding a predetermined threshold flows from the electric circuit to the coil 820I via the base piece 430I, the operating iron piece 830I is sucked to the fixed iron core 810I by a magnetic field generated in the fixed iron core 810I. Since the suction force at this time is stronger than the tensile force of the tension spring 802I, the operating iron piece 830I rotates about the rotation shaft 831I toward the fixed iron core 810I. Then, the tip end 833I of the operating iron piece 830I abuts on the head 461I of the shaft 460I, and moves the head 461I from the locking hole 481I to the insertion hole 482I.

When the head 461I of the shaft 460I comes out of the insertion hole 482I to the second end 330I side, the shaft 460I and the fixing plate 480I are disengaged. Then, as illustrated in FIG. 22, since by the tension spring 470I, the tensile force pulling toward the second end 330I acts on the separation piece 420I, the separation piece 420I moves toward the second end 330I. The separation piece 420I is pushed out along the P-P axis, that is, along the extending direction of the short side (i.e., the short direction) of the broken portion 400I, the separation piece 420I is separated from the base piece 430I, and the connection between the base pieces 430I on both sides is brought into a broken state. That is, the state in which the base pieces 430I on both sides of the broken portion 400I are energized via the separation piece 420I is broken, and overcurrent can be prevented from flowing through the electric circuit. At this time, the separation piece 420I moves, in contact with the base piece 430I, along the contact surfaces of the base piece 430I and the separation piece 420I (the contact surfaces of the end surface 433I of the base piece 430I and the side surface 421I of the separation piece 420I).

Immediately after the separation piece 420I is separated from the base piece 430I, there is a possibility that an arc occurs between the base pieces 430I. However, immediately after the separation piece 420I is separated from the base piece 430I, overcurrent II flowing through the electric circuit is induced to the fuse 840I via the electric wire 841I. The overcurrent II instantaneously fuses a fuse portion in the fuse 840I, and an arc occurring in the fuse 840I can be safely and quickly extinguished by the arc-extinguishing material in the fuse 840I. As a result, it is possible to prevent an arc from occurring between the base pieces 430I immediately after the separation piece 420I is separated from the base piece 430I.

Note that the operating iron piece 830I is sucked by the magnetic field occurring in the fixed iron core 810I, whereby the operating iron piece 830I rotates to disengage between the shaft 460I and the fixing plate 480I, but the present invention is not limited to this, and any configuration can be adopted as long as the shaft 460I and the fixing plate 480I can be disengaged when an abnormality such as overcurrent flowing through the electric circuit is detected. For example, in response to an abnormality signal when an abnormality such as overcurrent flowing through the electric circuit is detected, a power source such as gunpowder may be exploded, and the operating iron piece 830I may be rotated by the power, and the shaft 460I and the fixing plate 480I may be disengaged.

Eleventh Embodiment

Figure 23:
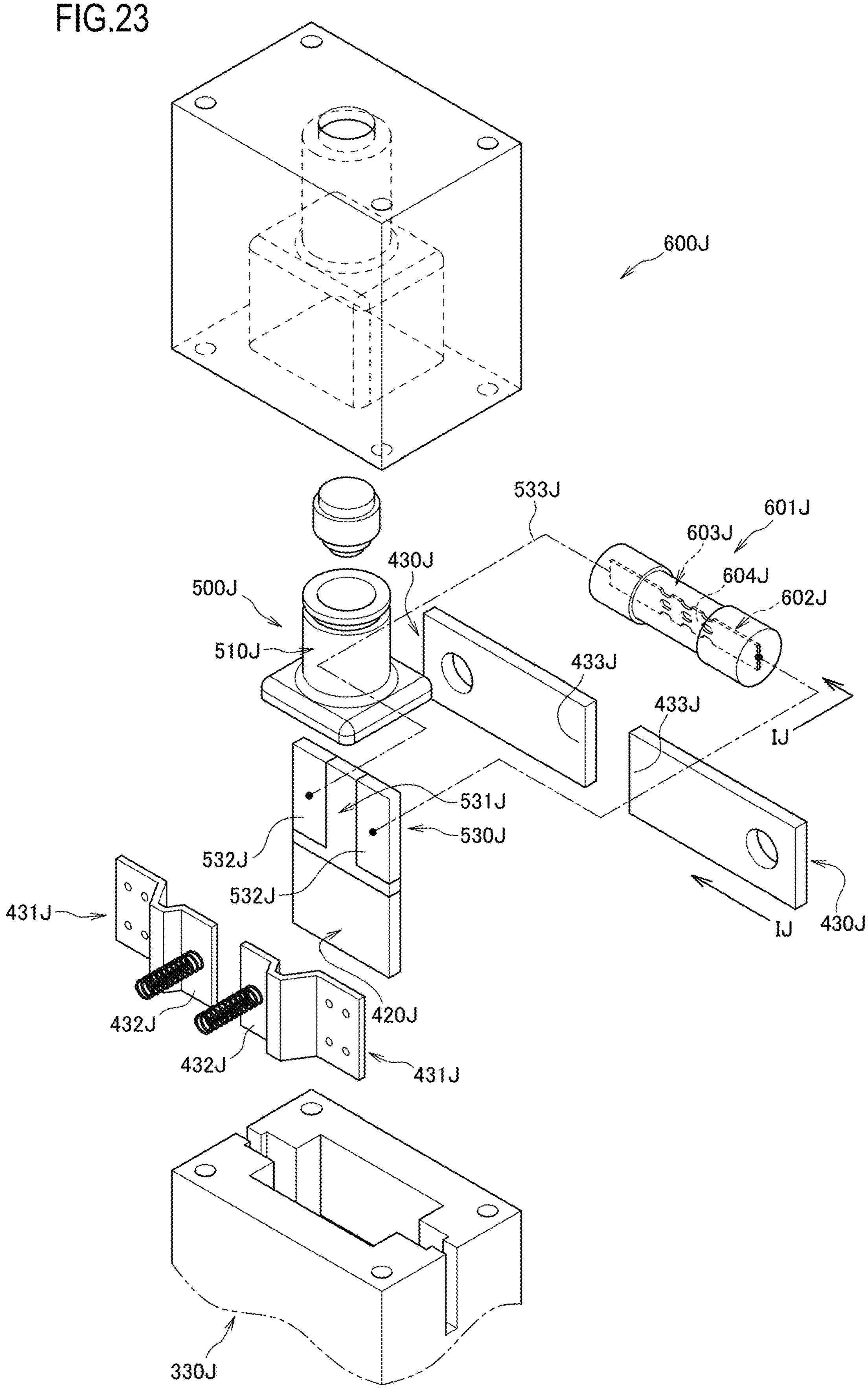
FIG. 23 is an exploded perspective view of an electric circuit breaker device according to an eleventh embodiment.

Next, an electric circuit breaker device 600J of the present invention according to the eleventh embodiment will be described with reference to FIG. 23. Note that FIG. 23 is an exploded perspective view of the electric circuit breaker device 600J according to the eleventh embodiment. Note that the configuration of the electric circuit breaker device 600J according to the eleventh embodiment is different from the configuration of the electric circuit breaker device 600A according to the second embodiment in the configuration of a protrusion portion 530J and including a fuse 601J, but the other configurations are basically the same as the configuration of the electric circuit breaker device 600A according to the second embodiment, and thus the description of the same configurations will be omitted.

As illustrated in FIG. 23, the protrusion portion 530J of a mobile body 500J of the electric circuit breaker device 600J is an insulator 531J having a plate shape. The insulator 531J is adjacent to the upper side of the separation piece 420J, and is disposed integrally with or separately from the separation piece 420J. Furthermore, both sides of the insulator 531J are provided with a pair of electrodes 532J made of metal, and the pair of electrodes 532J are insulated from each other by the insulator 531J. The pair of electrodes 532J are connected to the fuse 601J by an electric wire 533J. This fuse 601J is an existing fuse that is filled with a fuse element 602J made of metal conductor such as copper and, in the periphery of the fuse element 602J, an arc-extinguishing material 603J. The fuse element 602J is provided with a fuse portion 604J that generates heat and fuses when an unintended overcurrent flows through the electric circuit or the like. Note that for viewability of the configuration of the protrusion portion 530J, the protrusion portion 530J is illustrated separately from a main body 510J in the drawing, but the protrusion portion 530J is actually fixed to the main body 510J. The fuse 601J is attached to any position of the electric circuit breaker device 600J.

Then, an aspect in which the electric circuit breaker device 600J breaks the electric circuit when an abnormality such as overcurrent flowing through the electric circuit is detected is basically similar to the aspect described with reference to FIGS. 9 and 10. However, in the electric circuit breaker device 600J according to the eleventh embodiment, when the mobile body 500J moves downward and the insulator 531J pushes out and moves the separation piece 420J to a second end 330J side, the electrode 532J of the insulator 531J is gradually inserted while sliding between a flat surface 432J of a pressing connection portion 431J and an end surface 433J of a base piece 430J. In this manner, since the electrode 532J of the insulator 531J is gradually inserted along with movement of the mobile body 500J, until the separation piece 420J is completely separated from the base piece 430J, the separation piece 420J and the base piece 430J are connected, and the electrode 532J of the insulator 531J is also connected to the base piece 430J.

Then, when the separation piece 420J is completely separated from the base piece 430J along with the movement of the mobile body 500J, the base piece 430J is already electrically connected to the fuse 601J via the electrode 532J and the electric wire 533J, and therefore overcurrent IJ is smoothly and reliably induced to the fuse 601J. In this manner, in the process of separating the separation piece 420J from the base piece 430J, the separation piece 420J is continuously replaced with the electrode 532J, and the base piece 430J is reliably connected to the fuse 601J. Therefore, when the separation piece 420J is completely separated from the base piece 430J and the electric circuit is broken, an arc due to a fault current IJ can be prevented from being generated between the base pieces 430J on both sides. Furthermore, the fault current IJ induced in the fuse 601J is quickly broken by the fuse portion 604J of the fuse 601J being fused, and is safely and reliably broken by the arc-extinguishing material 603J.

The electric circuit breaker device of the present invention is not limited to the above embodiments, and various modifications and combinations are possible within the scope of the claims and the scope of the embodiments, and these modifications and combinations are also included in the scope of the right.

The invention claimed is:

1. An electric circuit breaker device comprising:

a broken portion constituting a part of an electric circuit, wherein the broken portion includes base pieces on both sides and a separation piece connected between the base pieces, and the electric circuit breaker device includes a pressing connection portion that connects, while pressing, contact surfaces of the base piece and the separation piece, and is configured such that the separation piece is moved by a power mechanism while being in contact along a contact surface with the base piece and is separated from the base piece, and thus connection between the base pieces is broken.

2. The electric circuit breaker device according to claim 1, wherein an arc-extinguishing portion is provided adjacent to the separation piece, and the arc-extinguishing portion is connected between the base pieces after the separation piece moves to break connection between the base pieces.

3. The electric circuit breaker device according to claim 2, wherein the arc-extinguishing portion is integrated with the separation piece.

4. The electric circuit breaker device according to claim 1, wherein an arc-extinguishing material having a fluid shape or a granular shape is disposed in a moving direction of the separation piece, and when the separation piece moves, the separation piece enters the arc-extinguishing material up to a connection terminal part of the separation piece.

5. The electric circuit breaker device according to claim 1 comprising an arc-extinguishing material disposed at a position coming into contact with a connection terminal part of the separation piece when the separation piece moves.

6. The electric circuit breaker device according to claim 1 comprising:

a mobile body that moves between a first end provided with the power mechanism and a second end opposite to the first end, wherein the mobile body is configured to move by power of the power mechanism to separate the separation piece from the base piece, and the mobile body is integrated with the separation piece.

7. The electric circuit breaker device according to claim 1 comprising: a fuse including a fuse portion and an arc-extinguishing material; and an insulator adjacent to the separation piece, wherein the insulator is provided with a pair of electrodes connected to the fuse, and when the separation piece moves to break connection between the base pieces, an electrode of the insulator is connected between the base pieces.

* * * * *